US012145388B2

(12) United States Patent
Amago et al.

(10) Patent No.: US 12,145,388 B2
(45) Date of Patent: Nov. 19, 2024

(54) RECORDING MEDIUM AND EXTERIOR MEMBER

(71) Applicant: Sony Group Corporation, Tokyo (JP)

(72) Inventors: Hirohisa Amago, Tokyo (JP); Hiroshi Mizuno, Tokyo (JP); Yuriko Kaino, Tokyo (JP)

(73) Assignee: Sony Group Corporation, Tokyo (JP)

( * ) Notice: Subject to any disclaimer, the term of this patent is extended or adjusted under 35 U.S.C. 154(b) by 226 days.

(21) Appl. No.: 17/788,076

(22) PCT Filed: Dec. 18, 2020

(86) PCT No.: PCT/JP2020/047367
§ 371 (c)(1),
(2) Date: Jun. 22, 2022

(87) PCT Pub. No.: WO2021/132060
PCT Pub. Date: Jul. 1, 2021

(65) Prior Publication Data

US 2023/0100784 A1 Mar. 30, 2023

(30) Foreign Application Priority Data

Dec. 27, 2019 (JP) ................................ 2019-239314

(51) Int. Cl.
*B41M 5/42* (2006.01)
*B41M 5/323* (2006.01)
(Continued)

(52) U.S. Cl.
CPC .............. *B41M 5/42* (2013.01); *B41M 5/323* (2013.01); *B41M 5/34* (2013.01); *B41M 5/443* (2013.01);
(Continued)

(58) Field of Classification Search
CPC .... B41M 5/305; B41M 5/323; B41M 5/3275; B41M 5/34; B41M 5/42; B41M 5/443;
(Continued)

(56) References Cited

U.S. PATENT DOCUMENTS

2003/0186030 A1 10/2003 Sasaki
2012/0238446 A1* 9/2012 Tsuchimura ............. B41M 5/44 503/226
2021/0268822 A1* 9/2021 Mizuno .................... B41M 5/42

FOREIGN PATENT DOCUMENTS

JP 2001277726 A * 10/2001
WO 2020003794 A1 1/2020

OTHER PUBLICATIONS

Keller et al. "Water Vapor Permeation in Plastics", 2017, p. 1-29. Acquired on Sep. 7, 2023 from https://www.pnnl.gov/main/publications/external/technical_reports/PNNL-26070.pdf (Year: 2017).*

(Continued)

*Primary Examiner* — Gerard Higgins
(74) *Attorney, Agent, or Firm* — K&L Gates LLP

(57) ABSTRACT

A recording medium according to an embodiment of the present disclosure includes: a recording layer including a leuco dye as a coloring compound; a first barrier film that is provided on each of one surface and another surface opposed to the one surface of the recording layer, and suppresses intrusion of moisture, oxygen, or both; and a second barrier film having chemical resistance and provided on a side surface of the recording layer continuously at least from a peripheral part of the one surface to a peripheral part of the other surface of the recording layer.

24 Claims, 12 Drawing Sheets

(51) Int. Cl.
*B41M 5/34* (2006.01)
*B41M 5/44* (2006.01)
*B41M 5/30* (2006.01)

(52) U.S. Cl.
CPC ......... *B41M 5/305* (2013.01); *B41M 2205/04* (2013.01); *B41M 2205/28* (2013.01); *B41M 2205/40* (2013.01)

(58) Field of Classification Search
CPC .......... B41M 2205/04; B41M 2205/28; B41M 2205/40
See application file for complete search history.

(56) References Cited

OTHER PUBLICATIONS

International Search Report from corresponding PCT application PCT/JP2020/047367, dated Feb. 16, 2021.

* cited by examiner

[ FIG. 1A ]
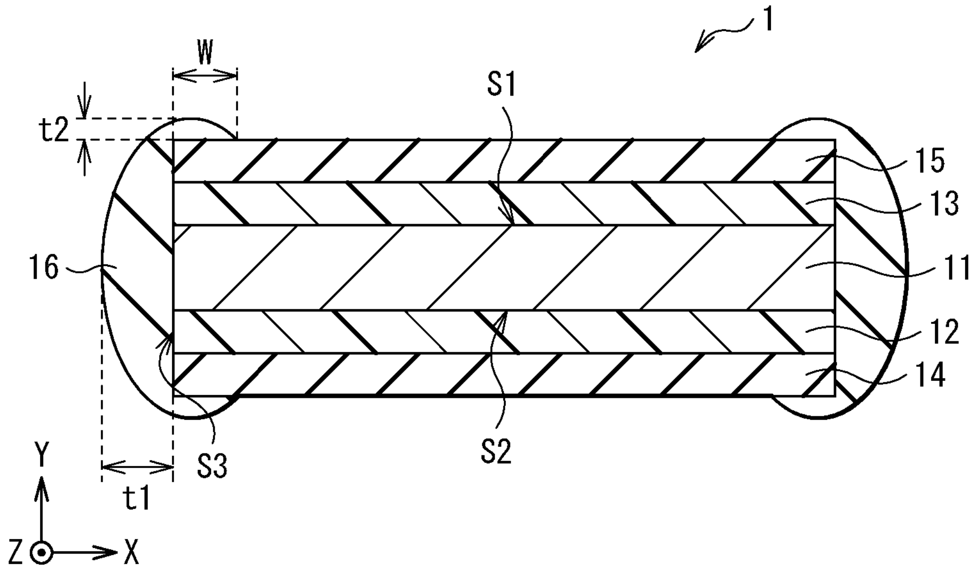
[ FIG. 1B ]
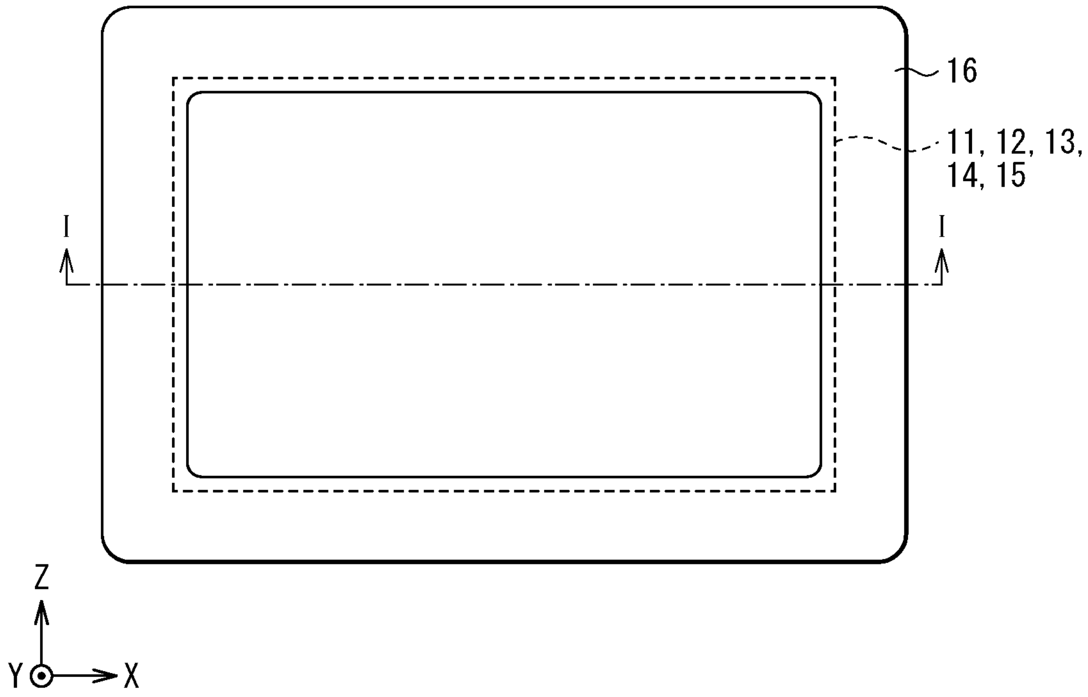

[ FIG. 2 ]
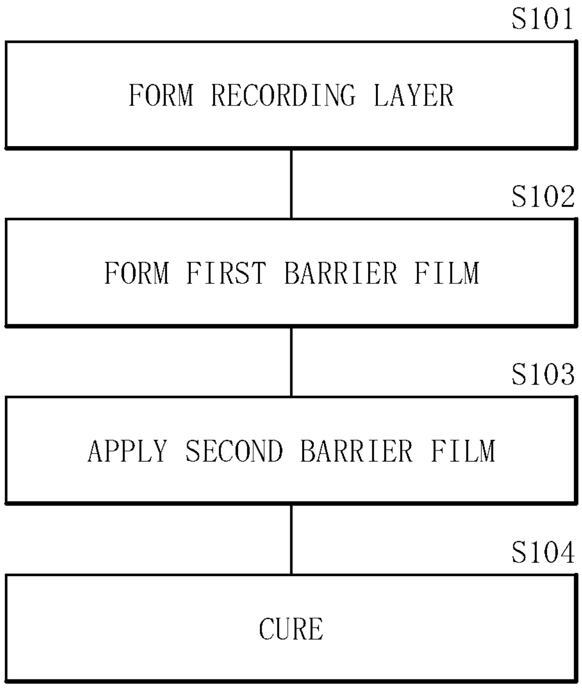

[ FIG. 3 ]
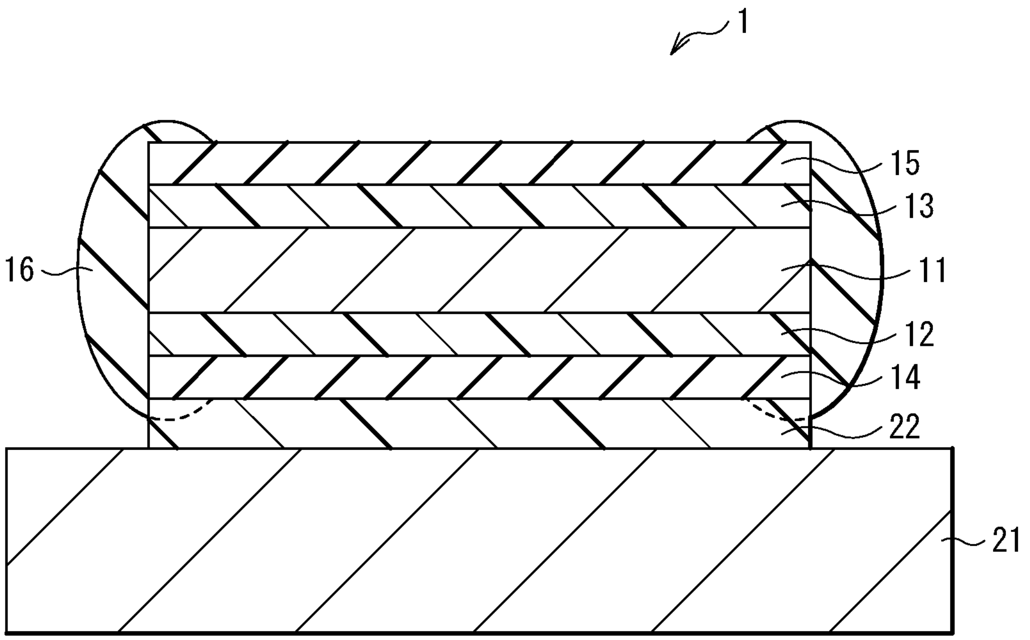
[ FIG. 4 ]
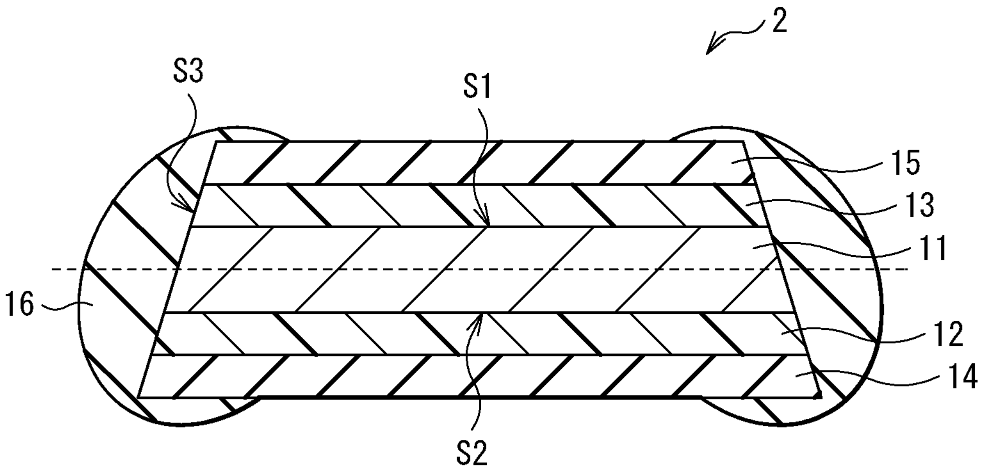

[ FIG. 5 ]
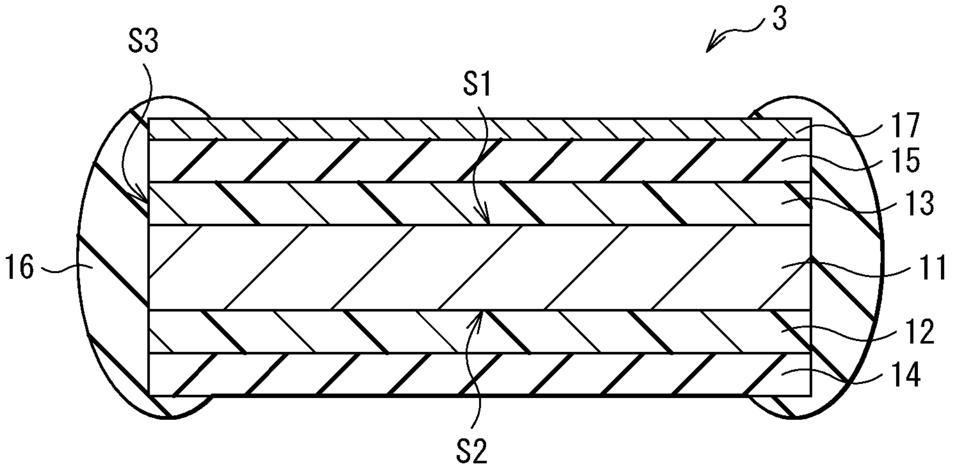
[ FIG. 6 ]
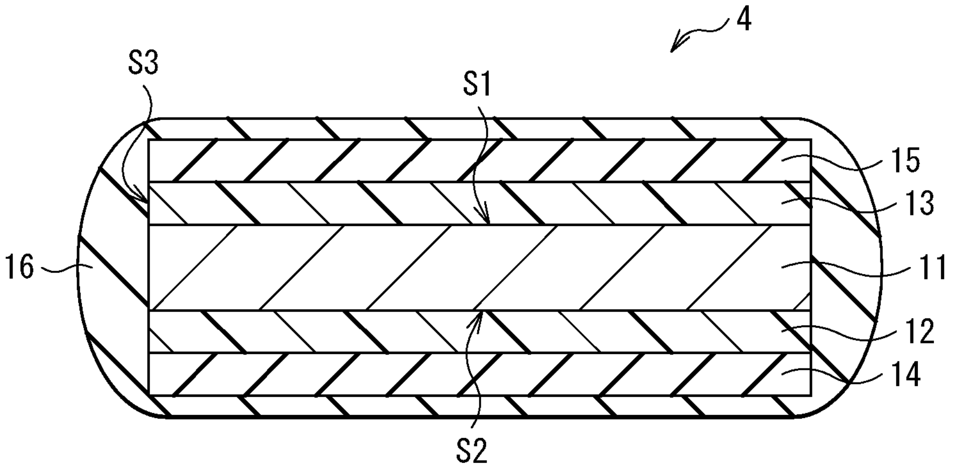

[FIG. 7]
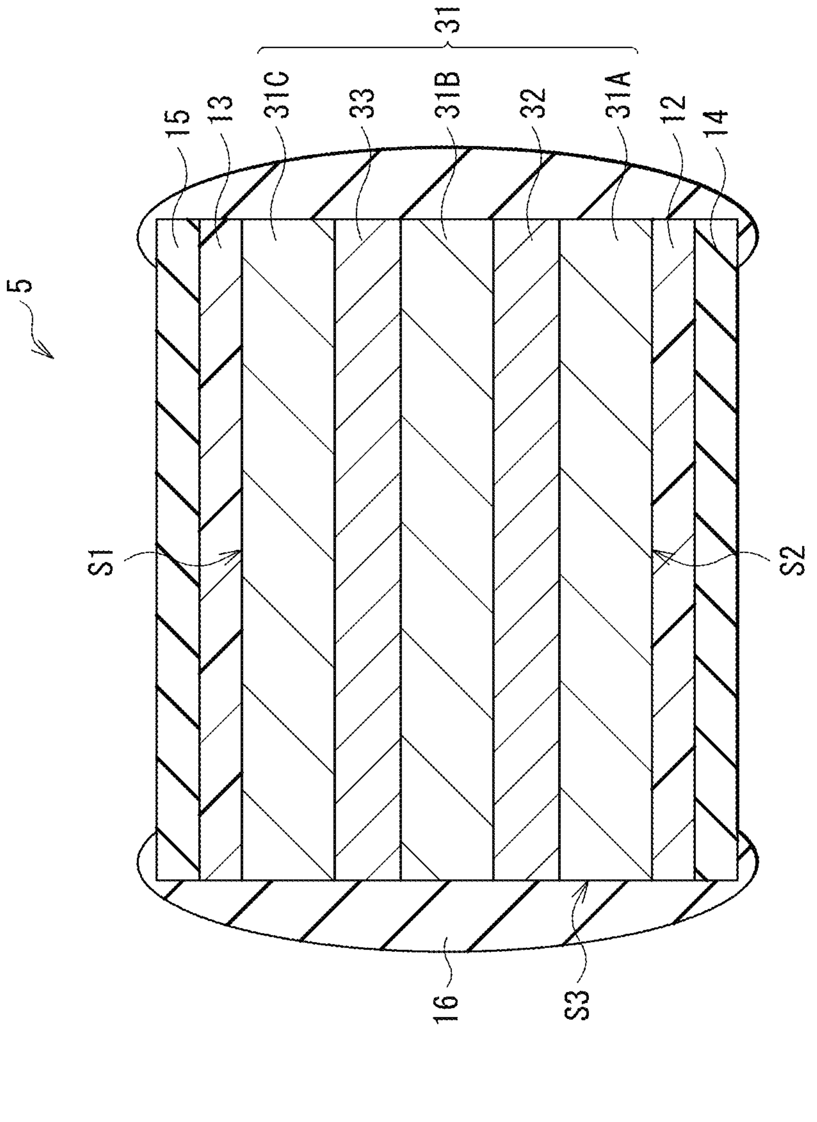

[ FIG. 8 ]
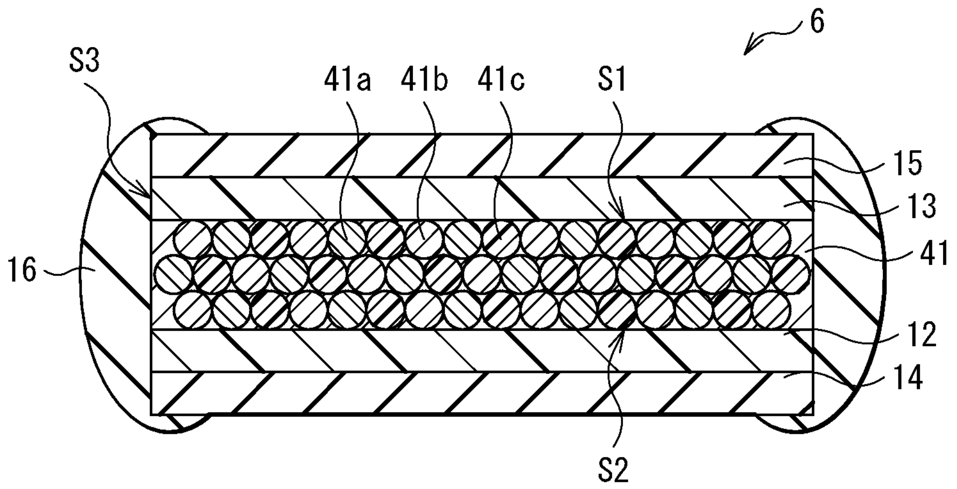

[ FIG. 9A ]
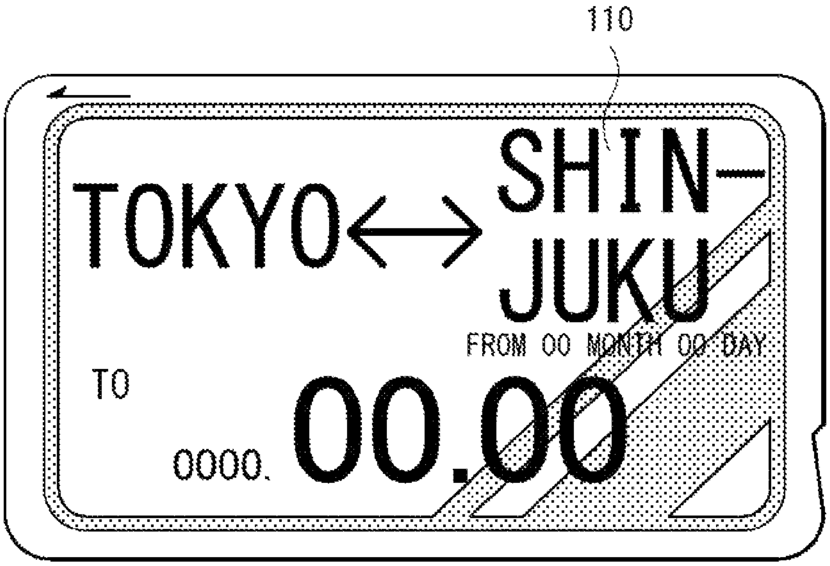
[ FIG. 9B ]
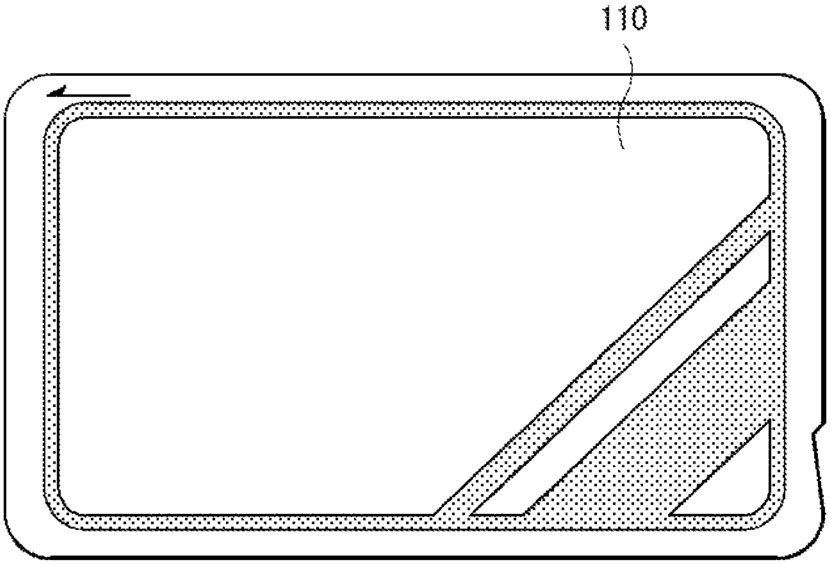

[ FIG. 10A ]
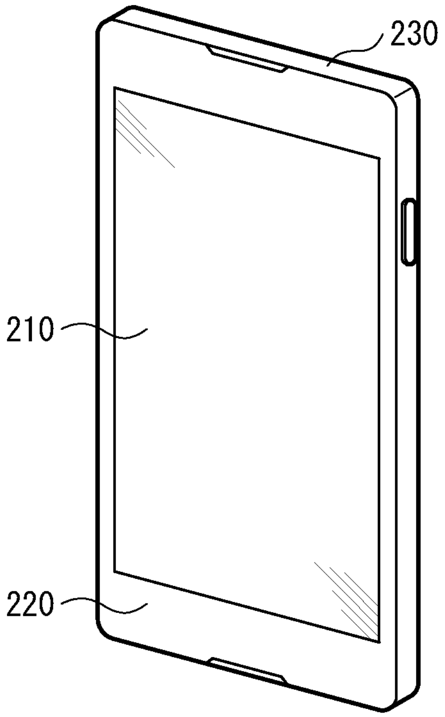
[ FIG. 10B ]
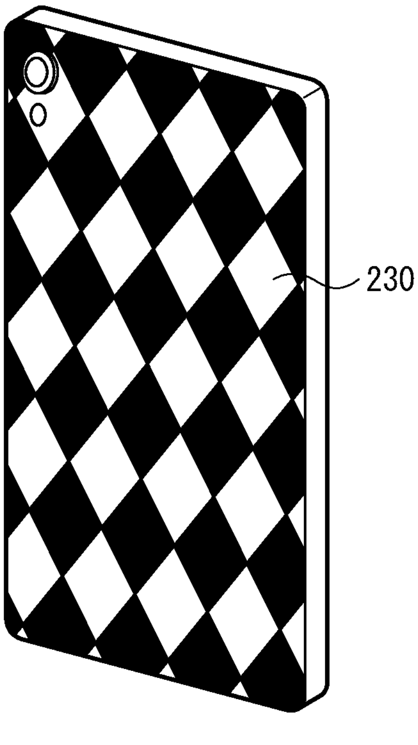

[ FIG. 11A ]
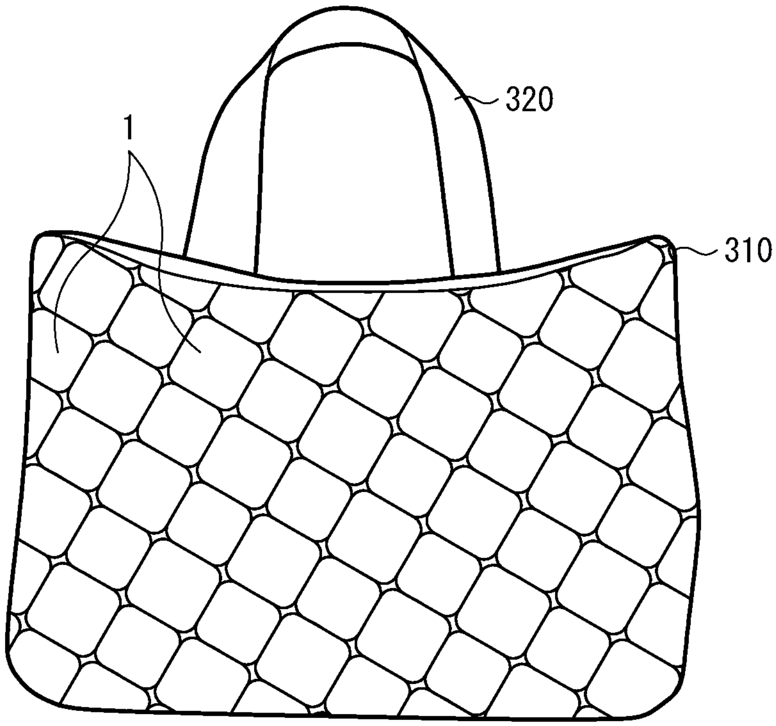
[ FIG. 11B ]

【FIG. 12】
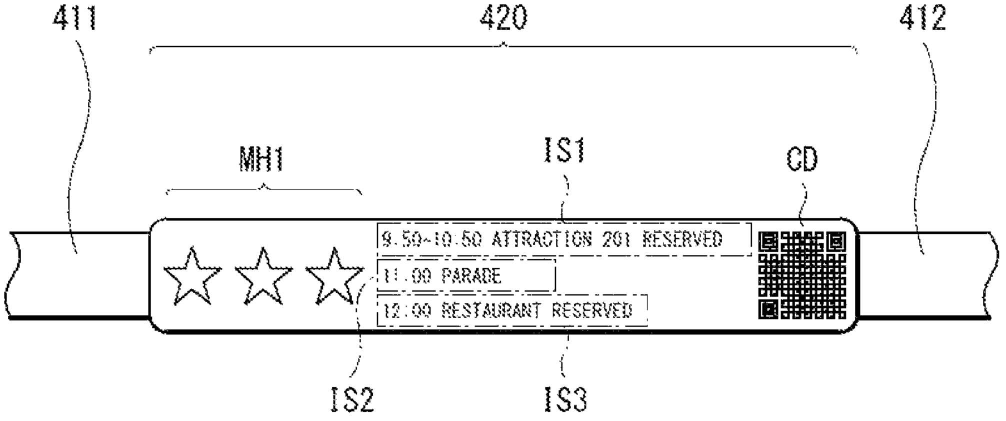

[ FIG. 13A ]
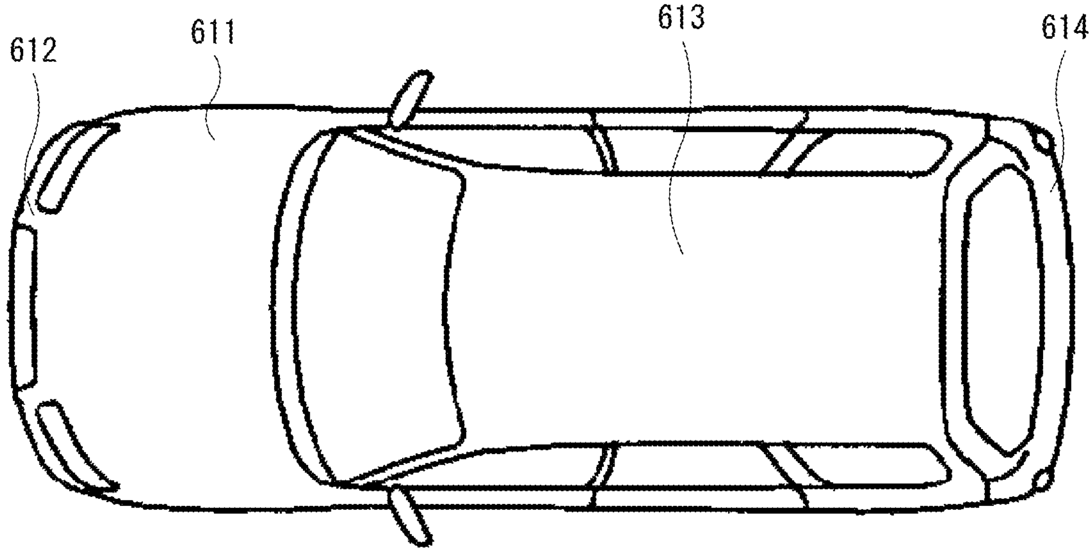
[ FIG. 13B ]
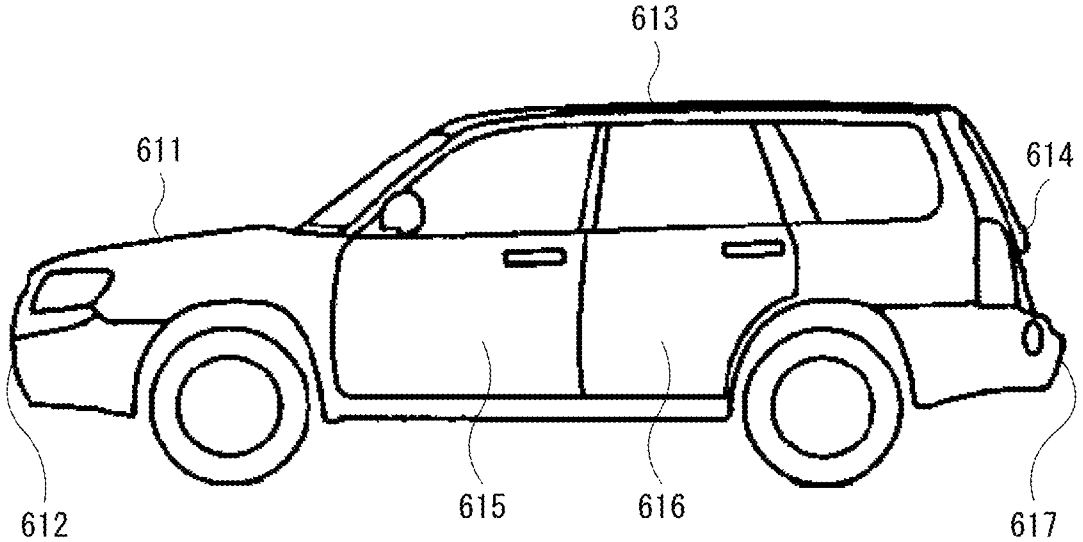

【 FIG. 14 】
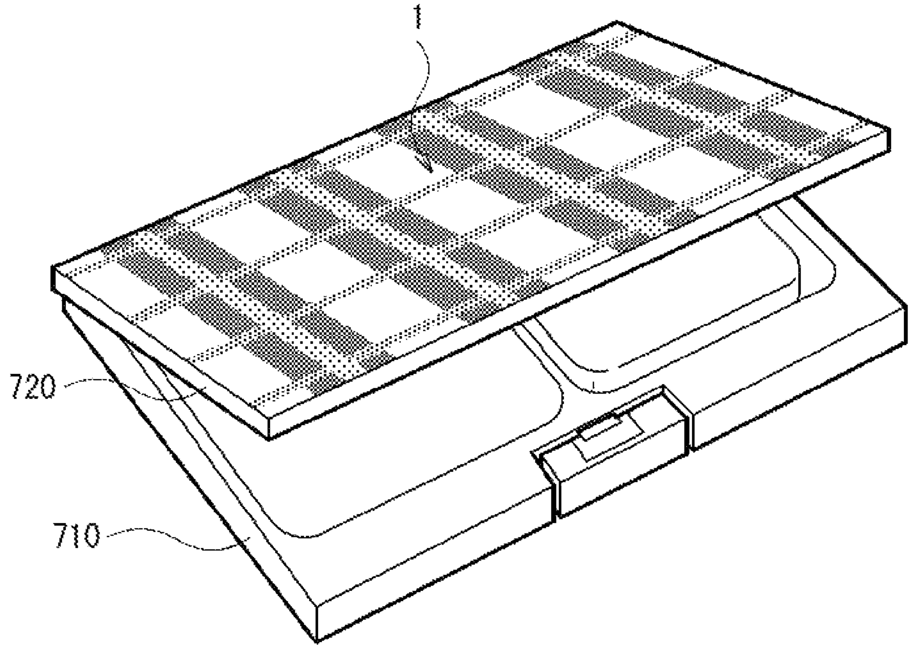

RECORDING MEDIUM AND EXTERIOR MEMBER

TECHNICAL FIELD

The present disclosure relates to a recording medium including one or more recording layers, and to an exterior member provided therewith.

BACKGROUND ART

For example, PTL 1 discloses a reversible heat-sensitive recording medium including a core film with an island-shaped reversible heat-sensitive recording part transferred thereto, the core film being protected by overlay films on a front surface side and a back surface side.

CITATION LIST

Patent Literature

PTL 1: Japanese Unexamined Patent Application Publication No. 2001-277726

SUMMARY OF THE INVENTION

Incidentally, a recording medium such as one described above is usable as an exterior member. In a case where the recording medium is used as an exterior member of, for example, an electronic device or the like, durability and high designability that would not spoil an external appearance of the electronic device are desired. In particular, regarding an end-part structure of the recording medium, durability and designability are in a trade-off relationship in many cases, and compatibility therebetween is thus desired.

It is desirable to provide a recording medium and an exterior member that make it possible to improve durability of display quality and designability.

A recording medium according to an embodiment of the present disclosure includes: a recording layer including a leuco dye as a coloring compound; a first barrier film that is provided on each of one surface and another surface opposed to the one surface of the recording layer, and suppresses intrusion of moisture, oxygen, or both; and a second barrier film having chemical resistance and provided on a side surface of the recording layer continuously at least from a peripheral part of the one surface to a peripheral part of the other surface of the recording layer.

An exterior member according to an embodiment of the present disclosure includes a support base provided with at least a recording medium. The recording medium includes components the same as those of the recording medium according to the above-described embodiment of the present disclosure.

In the reversible recording medium according to the embodiment of the present disclosure and the exterior member according to the embodiment of the present disclosure, the first barrier film that suppresses intrusion of moisture, oxygen, or both is provided on each of one surface and the other surface opposed to the one surface of the recording layer, and furthermore, the second barrier film having chemical resistance is provided on the side surface of the recording layer continuously from the side surface of the recording layer and the peripheral part of the one surface to the peripheral part of the other surface of the recording layer. This reduces a non-display region in an outer edge part of the recording layer while suppressing entry of environmental contaminants into the recording layer.

BRIEF DESCRIPTION OF DRAWINGS

FIG. 1A is a schematic cross-sectional diagram illustrating an example of a configuration of a recording medium according to an embodiment of the present disclosure.

FIG. 1B is a schematic diagram illustrating an example of a plan configuration of the configuration of the recording medium illustrated in FIG. 1A.

FIG. 2 is a flowchart illustrating an example of a manufacturing method of the recording medium illustrated in FIG. 1.

FIG. 3 is a schematic cross-sectional diagram illustrating an example of attachment of the recording medium illustrated in FIG. 1 onto a support base.

FIG. 4 is a schematic cross-sectional diagram illustrating an example of a configuration of a recording medium according to Modification Example 1 of the present disclosure.

FIG. 5 is a schematic cross-sectional diagram illustrating an example of a configuration of a recording medium according to Modification Example 2 of the present disclosure.

FIG. 6 is a schematic cross-sectional diagram illustrating an example of a configuration of a recording medium according to Modification Example 3 of the present disclosure.

FIG. 7 is a schematic cross-sectional diagram illustrating an example of a configuration of a recording medium according to Modification Example 4 of the present disclosure.

FIG. 8 is a schematic cross-sectional diagram illustrating an example of a configuration of a recording medium according to Modification Example 5 of the present disclosure.

FIG. 9A is a perspective diagram illustrating an example of an external appearance of Application Example 1.

FIG. 9B is a perspective diagram illustrating another example of the external appearance of Application Example 1.

FIG. 10A is a perspective diagram illustrating an example of an external appearance (a front surface side) of Application Example 2.

FIG. 10B is a perspective diagram illustrating an example of an external appearance (a rear surface side) of Application Example 2.

FIG. 11A is a perspective diagram illustrating an example of an external appearance of Application Example 3.

FIG. 11B is a perspective diagram illustrating another example of the external appearance of Application Example 3.

FIG. 12 is an explanatory diagram illustrating a configuration example of Application Example 4.

FIG. 13A is a perspective diagram illustrating an example of an external appearance (a top surface) of Application Example 5.

FIG. 13B is a perspective diagram illustrating an example of an external appearance (a side surface) of Application Example 5.

FIG. 14 is a perspective diagram illustrating an example of an external appearance of Application Example 6.

MODES FOR CARRYING OUT THE INVENTION

In the following, some embodiments of the present disclosure are described in detail with reference to the drawings. The following description is directed to specific examples of the present disclosure, and the present disclosure is not limited to the following embodiments. In addition, the arrangement, dimensions, dimensional ratios, and the like of components illustrated in the drawings should not be construed as limiting the present disclosure. It is to be noted that the description is given in the following order.

1. Embodiment (A recording medium with a recording layer whose side surface is covered with a barrier film having chemical resistance)
1-1. Configuration of Recording Medium
1-2. Manufacturing Method of Recording Medium
1-3. Methods of Recording and Deletion on and from Recording Medium
1-4. Workings and Effects
2. Modification Examples
2-1. Modification Example 1 (An example in which the side surface is an inclined surface)
2-2. Modification Example 2 (An example in which a hard coat layer is further provided)
2-3. Modification Example 3 (An example in which all surfaces of the recording layer is covered with the barrier film having chemical resistance)
2-4. Modification Example 4 (An example in which multiple recording layers are stacked)
2-5. Modification Example 5 (An example in which the recording layer includes multiple types of coloring compounds)
3. Application Examples
4. Examples

1. EMBODIMENT

FIG. 1A schematically illustrates an example of a cross-sectional configuration of a recording medium (a recording medium 1) according to an embodiment of the present disclosure. FIG. 1B schematically illustrates an example of a plan configuration of the recording medium 1 illustrated in FIG. 1A. FIG. 1A illustrates a cross section taken along line I-I illustrated in FIG. 1B. The recording medium 1 is a recording medium that enables information to be recorded and deleted reversibly or irreversibly by heat, and is used for decoration or the like of, for example, a printed part of an integrated circuit (IC) card, a wearable terminal such as a wristwatch, or an automobile.

1-1. Configuration of Recording Medium

The recording medium 1 includes first barrier films 14 and 15 that are respectively provided on a front surface (a surface S1) and a back surface (a surface S2) of a recording layer 11 with adhesive layers 12 and 13 interposed therebetween. In other words, the recording medium 1 has a structure in which, for example, the first barrier film 14, the adhesive layer 12, the recording layer 11, the adhesive layer 13, and the first barrier film 15 are stacked in this order. In the recording medium 1 according to the present embodiment, a second barrier film 16 is further provided on side surfaces S3 of the recording layer 11 including the adhesive layers 12 and 13 and the first barrier films 14 and 15. The second barrier film 16 has chemical resistance, and is specifically, as illustrated in FIGS. 1A and 1B, provided on four side surfaces (surfaces S3) of the recording layer 11 having, for example, a rectangular shape, continuously from a peripheral part of the front surface of the recording layer 11 (the surface S1, or to be precise, the first barrier film 15 provided on the front surface (the surface S1) side of the recording layer 11) to a peripheral part of the back surface of the recording layer 11 (the surface S2, or to be more precise, the first barrier film 14 provided on the back surface (the surface S2) side of the recording layer 11).

The recording layer 11 enables information to be recorded and deleted reversibly or irreversibly by heat. The recording layer 11 according to the present embodiment includes a material that allows for stable repeated recording and allows for control of a decolored state and a color-developed state. Specifically, the recording layer 11 includes, for example, a coloring compound, a color developing/quenching agent, and a photothermal conversion agent that are dispersed in a macromolecular material, for example. The recording layer 11 has a film thickness (hereinafter, simply referred to as a thickness) of 1 μm or more and 10 μm or less, for example.

As the coloring compound, a leuco dye is used, for example. Examples of the leuco dye include an existing dye for heat-sensitive paper. Specifically, one example thereof is a compound represented by the following formula (6) that includes, in a molecule, a group having an electron-donating property, for example.

[Chem. 1]

(6)

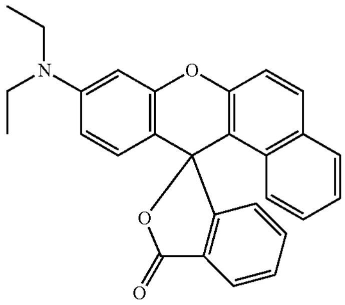

The coloring compound is not particularly limited, and is appropriately selectable in accordance with a purpose. Specific examples of the coloring compound include, in addition to the compound represented by the above formula (6), a fluoran-based compound, a triphenylmethane phthalide-based compound, an azaphthalide-based compound, a phenothiazine-based compound, a leuco auramine-based compound, an indolinophthalide-based compound, and the like. Other examples include 2-anilino-3-methyl-6-diethylaminofluoran, 2-anilino-3-methyl-6-di(n-butylamino)fluoran, 2-anilino-3-methyl-6-(N-n-propyl-N-methylamino)fluoran, 2-anilino-3-methyl-6-(N-isopropyl-N-methylamino)fluoran, 2-anilino-3-methyl-6-(N-isobutyl-N-methylamino)fluoran, 2-anilino-3-methyl-6-(N-n-amyl-N-methylamino)fluoran, 2-anilino-3-methyl-6-(N-sec-butyl-N-methylamino)fluoran, 2-anilino-3-methyl-6-(N-n-amyl-N-ethylamino)fluoran, 2-anilino-3-methyl-6-(N-iso-amyl-N-ethylamino)fluoran, 2-anilino-3-methyl-6-(N-n-propyl-N-isopropylamino)fluoran, 2-anilino-3-methyl-6-(N-cyclohexyl-N-methylamino)fluoran, 2-anilino-3-methyl-6-(N-ethyl-p-toluidino)fluoran, 2-anilino-3-methyl-6-(N-methyl-p-toluidino)fluoran, 2-(m-trichloromethylanilino)-3-methyl-6-diethylaminofluoran, 2-(m-trifluoromethylanilino)-3-methyl-6-diethylaminofluoran, 2-(m-trichloromethylanilino)-3-methyl-6-(N-cyclohexyl-N-methylamino)fluoran, 2-(2,4-dimethylanilino)-3-methyl-6-diethylaminofluoran, 2-(N-ethyl-p-toluidino)-3-methyl-6-(N-ethylanilino)fluoran, 2-(N-ethyl-p-toluidino)-3-methyl-6-(N-propyl-p-toluidino)fluoran, 2-anilino-6-(N-n-hexyl-N-ethylamino)fluoran, 2-(o-chloroanilino)-6-diethylaminofluoran, 2-(o-chloroanilino)-6-dibutylaminofluoran, 2-(m-trifluoromethylanilino) diethylaminofluoran, 2,3-dimethyl-6-dimethylaminofluoran, 3-methyl-6-(N-ethyl-p-toluidino)fluoran, 2-chloro-6-diethylaminofluoran, 2-bromo-6-diethylaminofluoran, 2-chloro-6-dipropylaminofluoran, 3-chloro-6-cyclohexylaminofluoran, 3-bromo cyclohexylaminofluoran, 2-chloro-6-(N-ethyl-N-isoamylamino)fluoran, 2-chloro methyl-6-diethylaminofluoran, 2-anilino-3-chloro-6-diethylaminofluoran, 2-(o-chloroanilino)-3-chloro-6-cyclohexylaminofluoran, 2-(m-trifluoromethylanilino)-3-chloro-6-diethylaminofluoran, 2-(2,3-dichloroanilino)-3-chloro-6-diethylaminofluoran, 1,2-benzo-6-diethylaminofluoran, 3-diethylamino-6-(m-trifluoromethylanilino)fluoran, 3-(1-ethyl-2-methylindole-3-yl)-3-(2-ethoxy-4-diethylaminophenyl)-4-azaphthalide, 3-(1-ethyl-2-methylindole-3-yl)-3-(2-ethoxy-4-diethylaminophenyl)-7-azaphthalide, 3-(1-octyl-2-methylindole-3-yl)-3-(2-ethoxy-4-diethylaminophenyl)-4-azaphthalide, 3-(1-ethyl-2-methylindole-3-yl)-3-(2-methyl-4-diethylaminophenyl)-4-azaphthalide, 3-(1-ethyl-2-methylindole-3-yl)-3-(2-methyl-4-diethylaminophenyl)-7-azaphthalide, 3-(1-ethyl-2-methylindole-3-yl)-3-(4-diethylaminophenyl)-4-azaphthalide, 3-(1-ethyl-2-methylindole-3-yl)-3-(4-N-n-amyl-N-methylaminophenyl)-4-azaphthalide, 3-(1-methyl-2-methylindole-3-yl)-3-(2-hexyloxy-4-diethylaminophenyl)-4-azaphthalide, 3,3-bis(2-ethoxy-4-diethylaminophenyl)-4-azaphthalide, 3,3-bis(2-ethoxy-4-diethylaminophenyl)-7-azaphthalide, 2-(p-acetylanilino)-6-(N-n-amyl-N-n-butylamino)fluoran, 2-benzylamino-6-(N-ethyl-p-toluidino)fluoran, 2-benzylamino-6-(N-methyl-2,4-dimethylanilino)fluoran, 2-benzylamino-6-(N-ethyl-2,4-dimethylanilino)fluoran, 2-benzylamino-6-(N-methyl-p-toluidino)fluoran, 2-benzylamino-6-(N-ethyl-p-toluidino) fluoran, 2-(di-p-methylbenzylamino)-6-(N-ethyl-p-toluidino)fluoran, 2-(α-phenylethylamino)-6-(N-ethyl-p-toluidino)fluoran, 2-methylamino-6-(N-methylanilino) fluoran, 2-methylamino-6-(N-ethylanilino)fluoran, 2-methylamino-6-(N-propylanilino)fluoran, 2-ethylamino-6-(N-methyl-p-toluidino)fluoran, 2-methylamino-6-(N-methyl-2,4-dimethylanilino)fluoran, 2-ethylamino-6-(N-ethyl-2,4-dimethylanilino)fluoran, 2-dimethylamino-6-(N-methylanilino)fluoran, 2-dimethylamino-6-(N-ethylanilino) fluoran, 2-diethylamino (N-methyl-p-toluidino)fluoran, 2-diethylamino-6-(N-ethyl-p-toluidino)fluoran, 2-dipropylamino-6-(N-methylanilino)fluoran, 2-dipropylamino-6-(N-ethylanilino)fluoran, 2-amino-6-(N-methylanilino)fluoran, 2-amino-6-(N-ethylanilino)fluoran, 2-amino-6-(N-propylanilino)fluoran, 2-amino-6-(N-methyl-p-toluidino)fluoran, 2-amino-6-(N-ethyl-p-toluidino)fluoran, 2-amino-6-(N-propyl-p-toluidino)fluoran, 2-amino-6-(N-methyl-p-ethylanilino)fluoran, 2-amino-6-(N-ethyl-p-ethylanilino)fluoran, 2-amino-6-(N-propyl-p-ethylanilino)fluoran, 2-amino-6-(N-methyl-2,4-dimethylanilino)fluoran, 2-amino-6-(N-ethyl-2,4-dimethylanilino)fluoran, 2-amino-6-(N-propyl-2,4-dimethylanilino)fluoran, 2-amino-6-(N-methyl-p-chloroanilino) fluoran, 2-amino-6-(N-ethyl-p-chloroanilino)fluoran, 2-amino-6-(N-propyl-p-chloroanilino)fluoran, 1,2-benzo-6-(N-ethyl-N-isoamylamino)fluoran, 1,2-benzo-6-dibutylaminofluoran, 1,2-benzo-6-(N-methyl-N-cyclohexylamino) fluoran, 1,2-benzo-6-(N-ethyl-N-toluidino)fluoran, and the like. For the recording layer 11, as the coloring compound, one of the above-described compounds may be used alone, or two or more of the above-described compounds may be used in combination.

The color developing/quenching agent serves, for example, to develop a color of a colorless coloring compound or to decolor a coloring compound colored in a predetermined color. Examples of the color developing/quenching agent include a phenol derivative, a salicylic acid derivative, a urea derivative, and the like. Specific examples thereof include a compound having a salicylic acid skeleton represented by the following general formula (7) and including, in a molecule, a group having an electron-accepting property.

[Chem. 2]

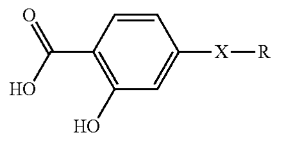

(7)

(X is one of —NHCO—, —CONH—, —NHCONH—, —CONHCO—, —NHNHCO—, —CONHNH—, —CONHNHCO—, —NHCOCONH—, —NHCONHCO—, —CONHCONH—, —NHNHCONH—, —NHCONHNH—, —CONHNHCONH—, —NHCONHNHCO—, and —CONHNHCONH—, and R is a straight-chain hydrocarbon group having 25 to 34 carbon atoms.)

Other examples of the color developing/quenching agent include 4,4'-isopropylidenebisphenol, 4,4'-isopropylidenebis(o-methylphenol), 4,4'-secondary butylidenebisphenol, 4,4'-isopropylidenebis(2-tertiary butylphenol), zinc p-nitrobenzoate, 1,3,5-tris(4-tertiary butyl-3-hydroxy-2,6-dimethylbenzyl)isocyanuric acid, 2,2-(3,4'-dihydroxydiphenyl) propane, bis(4-hydroxy-3-methylphenyl)sulfide, 4-{β-(p-methoxy phenoxy)ethoxy}salicylic acid, 1,7-bis(4-hydroxyphenylthio)-3,5-dioxaheptane, 1,5-bis(4-hydroxyphenylthio)-5-oxapentane, phthalic acid monobenzyl ester monocalcium salt, 4,4'-cyclohexylidenediphenol, 4,4'-isopropylidenebis(2-chlorophenol), 2,2'-methylenebis(4-methyl-6-tertiary-butylphenol), 4,4'-butylidenebis(6-tertiary-butyl-2-methyl)phenol, 1,1,3-tris(2-methyl-4-hydroxy-5-tertiary-butylphenyl)butane, 1,1,3-tris(2-methyl-4-hydroxy-5-cyclohexylphenyl)butane, 4,4'-thiobis(6-tertiary-butyl-2-methyl)phenol, 4,4'-diphenolsulfone, 4-isopropoxy-4'-hydroxy diphenylsulfone (4-hydroxy-4'-isopropoxydiphenylsulfone), 4-benzyloxy-4'-hydroxydiphenylsulfone, 4,4'-diphenolsulfoxide, isopropyl p-hydroxybenzoate, benzyl p-hydroxybenzoate, benzyl protocatechuate, stearyl gallate, lauryl gallate, octyl gallate, 1,3-bis(4-hydroxyphenylthio)-propane, N,N'-diphenylthiourea, N,N'-di(m-chlorophenyl)thiourea, salicylanilide, bis(4-hydroxyphenyl)acetic acid methyl ester, bis(4-hydroxyphenyl)acetic acid benzyl ester, 1,3-bis(4-hydroxycumyl) benzene, 1,4-bis(4-hydroxycumyl)benzene, 2,4'-diphenolsulfone, 2,2'-diallyl-4,4'-diphenolsulfone, 3,4-dihydroxyphenyl-4'-methyldiphenylsulfone, zinc 1-acetyloxy-2-naphthoate, zinc 2-acetyloxy-1-naphthoate, zinc 2-acetyloxy-3-naphthoate, α,α-bis(4-hydroxyphenyl)-α-methyltoluene, an antipyrine complex of zinc thiocyanate, tetrabromobisphenol A, tetrabromobisphenol S, 4,4'-thiobis(2-methylphenol), 4,4'-thiobis(2-chlorophenol), dodecylphosphonic acid, tetradecylphosphonic acid, hexadecylphosphonic acid, octadecylphosphonic acid, eicosylphosphonic acid, docosylphosphonic acid, tetracosylphosphonic acid, hexacosylphosphonic acid, octacosylphosphonic acid, α-hydroxy dodecylphosphonic acid, α-hydroxytetradecylphosphonic acid, α-hydroxyhexadecylphosphonic acid, α-hydroxyoctadecylphosphonic acid, α-hydroxy eicosylphosphonic acid, α-hydroxydocosylphosphonic acid, α-hydroxytetracosylphosphonic acid, dihexadecyl phosphate, dioctadecyl phosphate, dieicosyl phosphate, didocosyl phosphate, monohexadecyl phosphate, monooctadecyl phosphate, monoeicosyl phosphate, monodocosyl phosphate, methylhexadecyl phosphate, methyloctadecyl phosphate, methyleicosyl phosphate, methyldocosyl phosphate, amylhexadecyl phosphate, octylhexadecyl phosphate, laurylhexadecyl phosphate, and the like. For the recording layer 11, as the color developing/quenching agent, one of the above-described compounds may be used alone, or two or more of the above-described compounds may be used in combination.

The photothermal conversion agent serves, for example, to absorb light in a predetermined wavelength region of a near infrared region to thereby generate heat. As the photothermal conversion agent, for example, it is preferable to use a near infrared absorbing dye that has an absorption peak in a wavelength range of 700 nm or more and 2000 nm or less and hardly has absorption in a visible region. Specific examples thereof include a compound having a phthalocyanine skeleton (a phthalocyanine-based dye), a compound having a naphthalocyanine skeleton (a naphthalocyanine-based dye), a compound having a squarylium skeleton (a squarylium-based dye), a metal complex such as a dithio complex, a diimonium salt, an aminium salt, an inorganic compound, and the like. Examples of the inorganic compound include graphite, carbon black, metal powder particles, metal oxides including cobalt tetraoxide, iron oxide, chromium oxide, copper oxide, titanium black, and ITO, metal nitrides including niobium nitride, metal carbides including tantalum carbide, metal sulfides, various types of magnetic powders, and the like. Aside from the above, a compound having a cyanine skeleton (a cyanine-based dye) with superior light resistance and superior heat resistance may be used.

It is to be noted that the superior light resistance refers to undergoing no decomposition upon laser irradiation. The superior heat resistance refers to undergoing no change greater than or equal to 20% in maximum absorption peak value in an absorption spectrum in a case of, for example, being formed as a film together with a macromolecular material and stored at 150° C. for 30 minutes, for example. Examples of such a compound having a cyanine skeleton include a compound containing, in a molecule, one or both of a counter ion of one of $SbF_6$, $PF_6$, $BF_4$, $ClO_4$, $CF_3SO_3$ and $(CF_3SO_3)_2N$ and a methine chain containing a five-membered ring or a six-membered ring.

Although the cyanine-based dye is preferably provided with both of one of the above-described counter ions and a cyclic structure such as a five-membered ring and a six-membered ring in a methine chain, the provision of at least one of those allows sufficient light resistance and heat resistance to be secured. A material with superior light resistance and superior heat resistance undergoes no decomposition upon laser irradiation, as described above. Examples of a way to confirm the light resistance include a method of measuring a peak change in an absorption spectrum at the time of a xenon lamp irradiation test. In a case where a change rate is 20% or less upon irradiation for 30 minutes, it is possible to determine that the light resistance is favorable. Examples of a way to confirm the heat resistance include a method of measuring a peak change in an absorption spectrum upon storing at 150° C. In a case where a change rate is 20% or less after the 30-minute test, it is possible to determine that the heat resistance is favorable.

The macromolecular material is preferably a material that allows the coloring compound, the color developing/quenching agent, and the photothermal conversion agent to be easily dispersed uniformly therein. In addition, the macromolecular material preferably has high transparency to achieve high visibility of information to be written onto the recording layer 11, and preferably has high solubility in an organic solvent. Examples of the macromolecular material include a thermosetting resin and a thermoplastic resin. Specific examples thereof include polyvinyl chloride, polyvinyl acetate, a vinyl chloride-vinyl acetate copolymer, ethyl cellulose, polystyrene, a styrene-based copolymer, a phenoxy resin, polyester, aromatic polyester, polyurethane, polycarbonate, a polyacrylic acid ester, a polymethacrylic acid ester, an acrylic-acid-based copolymer, a maleic-acid-based polymer, polyvinyl alcohol, modified polyvinyl alcohol, hydroxy ethyl cellulose, carboxymethyl cellulose, starch, and the like.

The recording layer 11 includes at least one of the above-described coloring compounds, at least one of the color developing/quenching agents, and at least one of the photothermal conversion agents. For the coloring compound and the color developing/quenching agent included in the recording layer 11, it is preferable that a ratio between the coloring compound and the color developing/quenching agent be 1:2 (weight ratio), for example. The photothermal conversion agent varies depending on the film thickness of the recording layer 11. In addition, the recording layer 11 may include various additives in addition to the above-described materials. Examples of the additives include a sensitizer and an ultraviolet absorbing agent.

The adhesive layers 12 and 13 serve to attach the recording layer 11 and, for example, the first barrier films 14 and 15 that are to cover the front surface (the surface S1) and the back surface (the surface S2) of the recording layer 11 to each other. The adhesive layer 12 is provided on the back surface (the surface S2) side of the recording layer 11, and the adhesive layer 13 is provided on the front surface (the surface S1) side of the recording layer 11. The adhesive layers 12 and 13 preferably have high transparency to achieve high visibility of information to be written onto the recording layer 11, and preferably have high solubility in, for example, an organic solvent, similarly to the macromolecular material included in the recording layer 11. Examples of materials of the adhesive layers 12 and 13 include acryl-based, urethane-based, epoxy-based, and silicone-based adhesives. The adhesive layers 12 and 13 may be provided on respective opposite surfaces of a base such as PET as a support body, or may each be provided as a single adhesive without a base. Alternatively, the adhesive layers 12 and 13 may each include sheet-like layers attached to each other, or may each include an adhesive that has been dissolved in an organic solvent and thereafter applied and dried into an adhesive layer.

The first barrier films 14 and 15 serve to suppress intrusion of moisture, oxygen, or both into the recording layer 11. The first barrier films 14 and 15 each have a plan shape similar to that of the recording layer 11. The first barrier film 14 covers the back surface (the surface S2) of the recording layer 11, and the first barrier film 15 covers the front surface (the surface S1) of the recording layer 11.

The first barrier films 14 and 15 preferably have a water vapor transmission rate of 0.001 $g/m^2/day$ or more and 10 $g/m^2/day$ or less, for example. In addition, the first barrier films 14 and 15 preferably have high transparency to achieve high visibility of information to be written onto the recording layer 11, similarly to the macromolecular material included in the recording layer 11 and the adhesive layers 12 and 13. An example of such first barrier films 14 and 15 is a stacked film in which an inorganic oxide film is provided on a base including a plastic film. Where configured as the stacked film including the plastic film and the inorganic oxide film, each of the first barrier films 14 and 15 covers the recording layer 11 with, for example, the inorganic oxide film being on the recording layer 11 side (an inner side) and the plastic film being on an outer side.

It is possible to use an industrial plastic film, for example, for the plastic film serving as the base, and the plastic film preferably includes at least one of polyethylene terephthalate (PET), polycarbonate (PC), or polymethyl methacrylate (PMMA), for example. The plastic film preferably has a thickness of 5 μm or more and 100 μm or less, for example.

An example of the inorganic oxide film is a single-layered film or a stacked film including at least one of a silicon oxide film (an $SiO_x$ film), an aluminum oxide film (an $AlO_x$ film), or a silicon nitride film (an $SiN_x$ film) formed using, for example, a sputtering method, a chemical vapor deposition (Chemical Vapor Deposition: CVD) method, or the like. The first barrier films 14 and 15 preferably have a thickness of, for example, 10 nm or more and 1 μm or less.

The second barrier film 16 serves to prevent entry of environmental contaminants into the recording layer 11, and seals end parts of the recording layer 11, the adhesive layers 12 and 13, and the first barrier films 14 and 15. Specifically, the second barrier film 16 is provided on four side surfaces (surfaces S3) of the recording layer 11 having, for example, a rectangular shape, continuously from a peripheral part of a top surface (a surface 15S) of the first barrier film 15 provided on the front surface (the surface S1) side of the recording layer 11 to a peripheral part of a bottom surface (a surface 14S) of the first barrier film 14 provided on the back surface (the surface S2) side of the recording layer 11. It is to be noted that examples of the environmental contaminants include human's sweat, hand cream, sunscreen, and the like.

The second barrier film 16 preferably has high transparency to achieve high visibility of information to be written onto the recording layer 11, similarly to the macromolecular material included in the recording layer 11, the adhesive layers 12 and 13, and the first barrier films 14 and 15. In addition, the second barrier film 16 preferably has heat resistance, and preferably further has chemical resistance. In addition, the second barrier film 16 preferably has durability as high as a hardness of 6H or more. The hardness of 6H or more is a pencil hardness according to the JIS (a hardness test (a pencil method) conforming to JIS K5600-5-4), and is derivable from a scratch test in which a pencil having a known hardness is pressed against a coating film to thereby measure the hardness.

It is possible to form such a second barrier film 16 with use of, for example, an ultraviolet curable resin or a thermosetting resin. One example of the ultraviolet curable resin is an organic-inorganic hybrid material. Specifically, it is preferable to use an organic-inorganic hybrid material having a silsesquioxane skeleton represented by a composition formula $[(RSiO_{1.5})_n]$, for example. This makes it possible to prevent entry of environmental contaminants into the recording layer 11 without spoiling the external appearance of the recording medium 1. The silsesquioxane skeleton is represented by the following formulae (1) to (5), for example. It is to be noted that R in the formulae (1) to (5) is an organic group, and examples thereof include a radically polymerizable acryloyl group, a radically polymerizable methacryloyl group, and a cationically polymerizable oxetanyl group.

[Chem. 3]

(1)

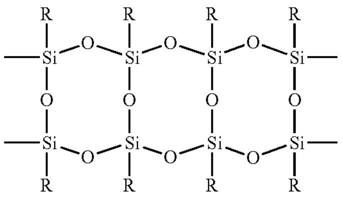

(2)

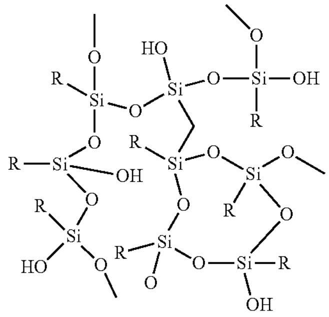

[Chem. 4]

(3)

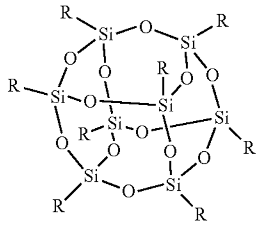

(4)

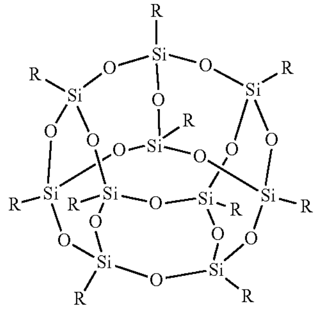

(5)

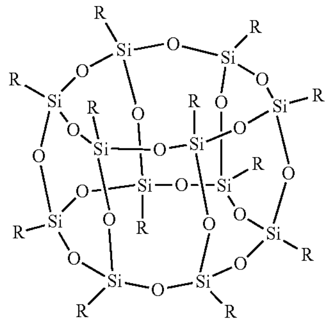

As described above, the second barrier film 16 is provided continuously from the peripheral part of the top surface (the surface 15S) of the first barrier film 15 provided on the front surface (the surface S1) side of the recording layer 11 to the peripheral part of the bottom surface (the surface 14S) of the first barrier film 14 provided on the back surface (the surface S2) side of the recording layer 11, and a cross section of the second barrier film 16 on each of the side surfaces (the surfaces S3) in a Y-axis direction has, for example, a curved-surface shape as illustrated in FIG. 1. The second barrier film 16 preferably has a thickness of 16 μm or more and 33 μm or less, for example. In addition, in a case where the cross section of the second barrier film 16 in the Y-axis direction has a curved-surface shape as illustrated in FIG. 1, a maximum thickness (t1) thereof is preferably 33 μm or less.

Furthermore, the second barrier film 16 has end parts extending onto a portion (the peripheral part) of the top surface (the surface 15S) of the first barrier film 15 and a portion (the peripheral part) of the bottom surface (the surface 14S) of the first barrier film 14. Widths (w) of extending portions of the second barrier film 16 on the top surface (the surface 15S) of the first barrier film 15 and the bottom surface (the surface 14S) of the first barrier film 14 are preferably, for example, less than 50 μm, which is a limit of human visibility, and more preferably 33 μm or less, from respective ends of the first barrier films 14 and 15. In addition, a thickness (t2) of the second barrier film 16 extending in the second barrier film 16 on each of the top surface (the surface S15S) of the first barrier film 15 and the bottom surface (the surface 14S) of the first barrier film 14 is preferably 10 μm or less, for example.

As will be described in detail later, the recording medium 1 is usable as a decorative member (an exterior member) of: a printed part of an IC card; an electronic apparatus such as a wearable terminal, a wearable display, or a portable device; a building, or the like. In this case, the recording medium 1 may be attached onto a support base 21 with an adhesive layer 22 interposed therebetween, for example, as illustrated in FIG. 3. The support base 21 is a casing of the electronic apparatus, for example. The adhesive layer 22 may include any of the materials listed for the foregoing adhesive layers 12 and 13, for example. In addition, as long as the support base 21 includes a material having high visibility such as glass or a highly transparent resin plate, a structure may be employed in which the support base 21 serves as an outermost surface of any of various apparatuses to which the recording medium 1 is to be applied.

1-2. Manufacturing Method of Recording Medium

The recording medium 1 according to the present embodiment is manufacturable using a coating method, for example. FIG. 2 is a flowchart illustrating an example of the manufacturing method of the recording medium 1. It is to be noted that the manufacturing method described below is merely exemplary, and any other method may be used for the manufacture.

First, as the macromolecular material, polyvinyl acetate, for example, is dissolved in a solvent (for example, methyl ethyl ketone). The color developing/quenching agent, the coloring compound, and the photothermal conversion agent are added to this solution, and dispersed therein. A coating material for the recording medium is thereby obtained. Subsequently, the coating material for the recording medium is applied onto the support base 21 into a thickness of, for example, 3 μm, and is dried at, for example, 70° C. to thereby form the recording layer 11. Next, for example, a thermosetting acrylic resin dissolved in an organic solvent is applied onto each of the front surface (the surface S1) and the back surface (the surface S2) of the recording layer 11 into a thickness of, for example, 10 μm, and is thereafter dried to thereby form the adhesive layers 12 and 13 (step S101).

Subsequently, the first barrier film 14 including an $SiO_2$ film that has been formed on a plastic film by a CVD method, for example, is attached to the back surface (the surface S2) of the recording layer 11 with the adhesive layer 12 interposed therebetween. In a similar manner, the first barrier film 15 including an $SiO_2$ film that has been formed on a plastic film by a CVD method, for example, is attached to the front surface (the surface S1) of the recording layer 11 with the adhesive layer 13 interposed therebetween (step S102).

Next, the second barrier film 16 is formed on the side surfaces (the surfaces S3) of the recording layer 11 including the adhesive layers 12 and 13 and the first barrier films 14 and 15 by the following method, for example (steps S103 and S104). First, an ultraviolet curable resin in a liquid form is applied onto a glass substrate having a high flatness into a predetermined film thickness with use of a bar coater. Subsequently, the side surfaces (the surfaces S3) of the recording layer 11 including the adhesive layers 12 and 13 and the first barrier films 14 and 15 are pressed against the ultraviolet curable resin applied on the glass substrate to thereby transfer the ultraviolet curable resin onto the side surfaces (the surfaces S3) (step S103). Thereafter, with use of an ultraviolet curing unit equipped with, for example, a high-pressure mercury lamp, the side surfaces (the surfaces S3) are each irradiated with ultraviolet light (UV light) for a predetermined time to thereby cure the ultraviolet curable resin (step S104) while performing a purge with a nitrogen ($N_2$) gas. The recording medium 1 illustrated in FIG. 1 is thereby completed.

1-3. Methods of Recording and Deletion on and from Recording Medium

It is possible to perform recording and deletion on and from the recording medium 1 according to the present embodiment in the following manner, for example.

First, the recording layer 11 is heated at a temperature enough to decolor the coloring compound, e.g., at a temperature of 120° C., to bring the recording layer 11 into a decolored state in advance. Next, with use of, for example, a semiconductor laser or the like, a desired location on the recording layer 11 is irradiated with near infrared light with its wavelength and output adjusted. This causes the photothermal conversion agent included in the recording layer 11 to generate heat to thereby cause a coloring reaction (a chromogenic reaction) to occur between the coloring compound and the color developing/quenching agent, thus allowing the irradiated portion to develop a color.

Meanwhile, in a case of decoloring a color-developed portion, irradiation is performed with near infrared light at energy enough to cause the color-developed portion to reach a decoloring temperature. This causes the photothermal conversion agent included in the recording layer 11 to generate heat, thus causing a decoloring reaction to occur between the coloring compound and the color developing/quenching agent. The irradiated portion is thereby decolored, and thus the record is deleted. In addition, in a case of deleting all of the records formed on the recording layer 11 at a time, the recording medium 1 is heated at a temperature enough to perform decoloring, e.g., at 120° C. This allows information recorded on the recording layer 11 to be deleted at a time. Thereafter, repeated recording onto the recording layer 11 is possible by performing the above-described operations.

It is to be noted that the color-developed state and the decolored state are kept unless the above-described chromogenic reaction and decoloring reaction such as the irradiation with near infrared light and the heating are performed.

1-4. Workings and Effects

In the recording medium 1 according to the present embodiment, the first barrier films 14 and 15 that suppress intrusion of moisture, oxygen, or both are respectively provided on the front surface (the surface S1) and the back surface (the surface S2) of the recording layer 11 with the adhesive layers 12 and 13 interposed therebetween, and furthermore, the second barrier film 16 having chemical resistance is provided on the side surfaces (the surfaces S3) of the recording layer 11 including the adhesive layers 12 and 13 and the first barrier films 14 and 15 continuously from the peripheral part of the top surface (the surface 15S) of the first barrier film 15 provided on the front surface (the surface S1) side of the recording layer 11 to the peripheral part of the bottom surface (the surface 14S) of the first barrier film 14 provided on the back surface (the surface S2) side of the recording layer 11. This makes it possible to reduce a non-display region in an outer edge part of the recording layer 11 while suppressing entry of environmental contaminants into the recording layer 11. This will be described in the following.

In recent years, development of a display medium to replace a printed matter has advanced, and attention has been focused on, as one example of the display medium, a recording medium that enables information to be recorded and deleted reversibly by heat. Such a recording medium typically includes a coloring compound having an electron-donating property, a color developing/quenching agent having an electron-accepting property, and a matrix polymer. Furthermore, addition of a photothermal conversion agent makes it possible to perform recording and deletion on and from the recording medium by irradiation with light of a specific wavelength. The recording medium is expected to be applied to, for example, decoration of a surface of a casing of an electronic apparatus, etc., or an interior, an exterior, or the like of a building, as well as printing on an IC card, a label, or the like.

The recording medium includes, for example, a leuco dye as a color developer, and such a recording medium has an issue that intrusion of moisture or oxygen thereinto through an end face causes a reduction in optical color density in the vicinity of the end face, thereby degrading display quality. As a solution to this issue, for example, a method is conceivable in which the recording medium is put into a packaging bag including a gas barrier laminate, and peripheral parts are bonded to each other by thermal fusion bonding. In addition, a method is conceivable in which the recording medium is sandwiched using barrier layers and the end faces are sealed using a two-part curable adhesive. Alternatively, a method is conceivable in which a moisture-proof film is sealed at a collection end of the recording medium by means of a resin film and a laminating agent. However, in a case where the above-described methods are used, a sealing width is generated on the end face of the recording medium, and this can result in degradation in designability.

In addition, in a recording medium such as one described above, display quality can deteriorate due to discoloration or the like caused by adhesion of an environmental contaminant such as human's sweat, hand cream, sunscreen, or the like. This presumably occurs due to a crack that develops in a surface around a part being processed when the recording medium is processed into a predetermined size and shape in a manufacturing process of the recording medium, or due to entry of chemicals from an end part being processed.

To cope with this, in the present embodiment, the first barrier films 14 and 15 that suppress intrusion of moisture, oxygen, or both are respectively provided on the front surface (the surface S1) and the back surface (the surface S2) of the recording layer 11 with the adhesive layers 12 and 13 interposed therebetween, and furthermore, the second barrier film 16 having chemical resistance is provided continuously on the side surfaces (the surfaces S3) of the recording layer 11 including the adhesive layers 12 and 13 and the first barrier films 14 and 15. Furthermore, the second barrier film 16 is extended onto a portion of the top surface (the surface 15S) of the first barrier film 15 and a portion of the bottom surface (the surface 14S) of the first barrier film 14 to cover the respective peripheral parts. This makes it possible to prevent entry of environmental contaminants from a crack developing in any of the side surfaces (the surfaces S3) and surfaces of the peripheral parts of the first barrier films 14 and 15, while reducing the sealing width of the outer edge part which is to be a non-display region of the recording medium 1.

As described above, in the recording medium 1 according to the present embodiment, the front surface (the surface S1) and the back surface (the surface S2) of the recording layer 11 are covered with the first barrier films 14 and 15. In addition, the side surfaces (the surfaces S3) of the recording layer 11 including the adhesive layers 12 and 13 and the first barrier films 14 and 15, and the peripheral parts of the first barrier films 14 and 15 are covered with the second barrier film 16 having chemical resistance. This reduces entry of environmental contaminants from a crack developing in any of the side surfaces (the surfaces S3) and the surfaces of the peripheral parts of the first barrier films 14 and 15. It thus becomes possible to improve durability of the display quality and also improve designability. This makes it possible to provide an electronic apparatus and a decorative member that are superior in design quality.

Next, a description will be given of modification examples (Modification Examples 1 to 5) of the present disclosure. In the following, components similar to those of the above-described embodiment are denoted by the same reference numerals, and descriptions thereof are omitted where appropriate.

2. MODIFICATION EXAMPLES

2-1. Modification Example 1

FIG. 4 schematically illustrates an example of a cross-sectional configuration of a recording medium (a recording medium 2) according to Modification Example 1 of the present disclosure. The foregoing embodiment illustrates an example in which the recording layer 11 including the adhesive layers 12 and 13 and the first barrier films 14 and 15 has the side surfaces (the surfaces S3) that are substantially perpendicular to, for example, a plan direction (an XZ direction) of the recording layer 11; however, the side surfaces (the surfaces S3) may each be an inclined surface that forms an obtuse angle on the front surface (the surface S1) side of the recording layer 11, as illustrated in FIG. 4. The side surfaces (the surfaces S3) inclined in such a manner are formed by processing the recording medium 2 using a laser, for example.

In the recording medium 2 according to the present modification example, the curved surface of the second barrier film 16 on each of the side surfaces (the surfaces S3) has a shape with curvatures different between the front surface (the surface S1) side and the back surface (the surface S2) side of the recording layer 11. Specifically, for example, as illustrated in FIG. 4, in a case where a cross section of the recording layer 11 including the adhesive layers 12 and 13 and the first barrier films 14 and 15 has a trapezoidal shape and a length of a lower base (the back surface (the surface S2) side) is greater than a length of an upper base (the front surface (the surface S1) side), the curvature on the back surface (the surface S2) side is greater than the curvature on the front surface (the surface S1) side. In addition, in the present embodiment, the second barrier film 16 on the side surfaces (the surfaces S3) has a maximum thickness on the back surface (the surface S2) side of the recording layer 11.

With the recording medium 2 in which the side surfaces (the surfaces S3) of the recording layer 11 including the adhesive layers 12 and 13 and the first barrier films 14 and 15 are inclined surfaces as described above, similar effects to those of the foregoing embodiment are also obtainable. In addition, by forming the side surfaces (the surfaces S3) into inclined surfaces and attaching the first barrier film 14 side to the support base 21 or the like as in the present modification example, an effect is achieved that it is possible to suppress exfoliation of the recording medium 2 or damage thereto caused by snagging of an end part. In addition, an effect is achieved that it is easy to control the film thickness of the second barrier film 16.

It is to be noted that although FIG. 4 illustrates an example in which the length on the back surface (the surface S2) side of the recording layer 11 is greater than the length on the front surface (the surface S1) side, the recording layer 11 may have a shape in which the length of the front surface (the surface S1) side is greater than the length on the back surface (the surface S2) side.

2-2. Modification Example 2

FIG. 5 schematically illustrates an example of a cross-sectional configuration of a recording medium (a recording medium 3) according to Modification Example 2 of the present disclosure. A hard coat layer 17 may further be provided on the first barrier film 15 on the front surface (the surface S1) side of the recording layer 11.

The hard coat layer 17 serves to protect the surface from cuts, scrapes, dents, solvents, and the like in a case where the recording medium is disposed at the outermost surface. The hard coat layer 17 includes, for example, an ultraviolet curable acrylic resin, a melamine resin, or a urethane resin. The hard coat layer 17 preferably has a thickness of 1 μm or more and 20 μm or less, for example.

Furthermore, another optical thin film may be provided between the first barrier film 15 and the hard coat layer 17. Examples of such another optical film include a UV absorbing layer. The UV absorbing layer includes, for example, an ultraviolet absorbing agent, and serves to absorb ultraviolet light (for example, a wavelength of 200 nm or more and 500 nm or less) included in external light or the like to thereby reduce exposure of the recording layer 11 to the ultraviolet light. Examples of the ultraviolet absorbing agent include triazine, benzoloriazole, benzophenone, and the like that have absorption in a wavelength region of 500 nm or less, for example.

Providing the hard coat layer 17 on the front surface (the surface S1) side of the recording layer 11 as described above makes it possible to prevent degradation of the recording layer 11 caused by ultraviolet light, a solvent, or physical impact, in addition to providing the effects of the foregoing embodiment. It thus becomes possible to further improve the durability of display quality.

2-3. Modification Example 3

FIG. 6 schematically illustrates an example of a cross-sectional configuration of a recording medium (a recording medium 4) according to Modification Example 3 of the present disclosure. The foregoing embodiment illustrates an example in which the second barrier film 16 is provided on the side surfaces (the surfaces S3) of the recording layer 11 including the adhesive layers 12 and 13 and the first barrier films 14 and 15 continuously from the peripheral part of the top surface (the surface 15S) of the first barrier film 15 to the peripheral part of the bottom surface (the surface 14S) of the first barrier film 14; however, the second barrier film 16 may cover entire surfaces of the first barrier films 14 and 15.

It is possible for the second barrier film 16 covering the first barrier film 14 to also serve as the hard coat layer 17 described above, for example.

By providing the second barrier film 16 on the entire surfaces of the first barrier films 14 and 15 in addition to the side surfaces (the surfaces S3) of the recording layer 11 including the adhesive layers 12 and 13 and the first barrier films 14 and 15, an effect is achieved that it is possible to record or delete information uniformly to the end of the recording layer 11, in addition to the effects of the foregoing embodiment. In addition, it becomes possible to improve visibility because an interface between the first barrier film 15 and the second barrier film 16 on the front surface of the recording medium 4 is eliminated. In addition, it becomes possible to further reduce penetration (entry) of moisture into the recording layer 11.

2-4. Modification Example 4

FIG. 7 schematically illustrates an example of a cross-sectional configuration of a recording medium (a recording medium 5) according to Modification Example 4 of the present disclosure. The foregoing embodiments, etc. illustrate an example of having the recording layer 11 that is single-layered; however, a recording layer (a recording layer 31) including multiple layers may be provided. The recording medium 5 according to the present modification example differs from the foregoing embodiment in having the recording layer 31 that has a stacked structure in which, for example, three layers (a first layer 31A, a second layer 31B, and a third layer 31C) are stacked. Intermediate layers 32 and 33 are provided as heat-insulating layers between the respective adjacent layers 31A, 31B, and 31C included in the recording layer 31.

The recording layer 31 enables information to be recorded and deleted reversibly by heat, for example, and has a structure in which, as described above, the first layer 31A, the second layer 31B, and the third layer 31C are stacked in this order, for example. The first layer 31A, the second layer 31B, and the third layer 31C include, for example, respective macromolecular materials in which respective coloring compounds to be colored in mutually different colors, respective color developing/quenching agents corresponding to the respective coloring compounds, and respective photothermal conversion agents that absorb pieces of light in mutually different wavelength regions to thereby generate heat are dispersed.

Specifically, the first layer 31A includes, for example, a coloring compound (e.g., a coloring compound A) to be colored in a cyan color, a color developing/quenching agent (e.g., a color developing/quenching agent A) corresponding to the coloring compound, and a photothermal conversion agent (e.g. a photothermal conversion agent A) that absorbs, for example, infrared light of a wavelength $\lambda_1$ to thereby generate heat. The second layer 31B includes, for example, a coloring compound (e.g., a coloring compound B) to be colored in a magenta color, a color developing/quenching agent (e.g., a color developing/quenching agent B) corresponding to the coloring compound, and a photothermal conversion agent (e.g., a photothermal conversion agent B) that absorbs, for example, infrared light of a wavelength $\lambda_2$ to thereby generate heat. The third layer 31C includes, for example, a coloring compound (e.g., a coloring compound C) to be colored in a yellow color, a color developing/quenching agent (e.g., a color developing/quenching agent C) corresponding to the coloring compound, and a photothermal conversion agent (e.g., a photothermal conversion agent C) that absorbs, for example, infrared light of a wavelength $\lambda_3$ to thereby generate heat. The wavelengths $\lambda_1$, $\lambda_2$, and $\lambda_3$ differs from each other, thus making it possible to obtain a display medium allowing for multicolor display.

It is to be noted that, for the photothermal conversion agents, selecting a combination of materials having narrow light absorption bands that do not overlap one another in a wavelength range of 700 nm or more and 2000 nm or less is preferable. This makes it possible to selectively color or decolor a desired layer of the first layer 31A, the second layer 31B, and the third layer 31C.

The first layer 31A, the second layer 31B, and the third layer 31C each preferably have a thickness of 1 μm or more and 20 μm or less, for example, and more preferably a thickness of 2 μm or more and 15 μm or less, for example. One reason for this is that if the layers 31A, 31B, and 31C each have a thickness of less than 1 μm, there is a possibility that sufficient color development density may not be obtained. In addition, another reason for this is that in a case where the layers 31A, 31B, and 31C each have a thickness of more than 20 μm, a color-developing property and a decoloring property can deteriorate due to larger amount of heat utilization of each of the layers 31A, 31B, and 31C.

In addition, similarly to the recording layer 11 described above, the first layer 31A, the second layer 31B, and the third layer 31C may each include various additives such as a sensitizer and an ultraviolet absorbing agent, for example, in addition to the above-described materials.

In addition, in the recording layer 31 according to the present modification example, the intermediate layers 32 and 33 are respectively provided between the first layer 31A and the second layer 31B and between the second layer 31B and the third layer 31C. The intermediate layers 32 and 33 each include, for example, a typical macromolecular material having light transmissivity. Specific examples of the material include polyvinyl chloride, polyvinyl acetate, a vinyl chloride-vinyl acetate copolymer, ethyl cellulose, polystyrene, a styrene-based copolymer, a phenoxy resin, polyester, aromatic polyester, polyurethane, polycarbonate, a polyacrylic acid ester, a polymethacrylic acid ester, an acrylic-acid-based copolymer, a maleic-acid-based polymer, polyvinyl alcohol, modified polyvinyl alcohol, hydroxy ethyl cellulose, carboxymethyl cellulose, starch, and the like. It is to be noted that the intermediate layers 32 and 33 may each include various additives, including an ultraviolet absorbing agent, for example.

In addition, the intermediate layers 32 and 33 may each include an inorganic material having light transmissivity. For example, the use of porous silica, porous alumina, porous Mania, porous carbon, a composite thereof, or the like is preferable because lower thermal conductivity results to provide a higher heat-insulating effect. It is possible to form the intermediate layers 32 and 33 by a sol-gel method, for example.

The intermediate layers 32 and 33 each preferably have a thickness of 3 to 100 μm, for example, and more preferably a thickness of 5 μm or more and 50 μm or less, for example. One reason for this is that if the intermediate layers 32 and 33 are excessively small in thickness, a sufficient heat-insulating effect is not obtainable, and if the intermediate layers 32 and 33 are excessively large in thickness, thermal conductivity deteriorates and light transmissivity is lowered upon uniformly heating the entire recording medium 2.

Furthermore, the side surfaces (the surfaces S3) of the recording layer 31 including the adhesive layers 12 and 13 and the first barrier films 14 and 15 may be inclined surfaces, as in the recording medium 2 according to Modification Example 1, for example. Alternatively, as in the recording medium 3 according to Modification Example 3, the hard coat layer 17 or the like may be provided on the first barrier film 15. Still alternatively, as in the recording medium 4 according to Modification Example 4, the second barrier film 16 may cover the entire surfaces of the first barrier films 14 and 15.

It is possible to perform recording and deletion on and from the recording medium 5 according to the present modification example in the following manner, for example. It is to be noted that a description will be given here with reference to the above-described case in which the recording layer 31 includes the first layer 31A, the second layer 31B, and the third layer 31C that are to be colored in the cyan color, the magenta color, and the yellow color, respectively, are stacked, as an example.

First, heating is performed at a temperature enough to cause the recording layer 31 (the first layer 31A, the second layer 31B, and the third layer 31C) to be decolored, e.g., at 120° C., to thereby bring the recording layer 31 into a decolored state in advance. Next, with use of a semiconductor laser or the like, for example, a desired portion of the recording layer 31 is irradiated with infrared light having a wavelength and an output that are freely chosen. Here, in a case of causing the first layer 31A to develop a color, irradiation is performed with the infrared light of the wavelength $\lambda_1$ at energy enough to cause the first layer 31A to reach a color-developing temperature. This causes the photothermal conversion agent A included in the first layer 31A to generate heat to cause a coloring reaction (chromogenic reaction) to occur between the coloring compound A and the color developing/quenching agent A, thus allowing the irradiated portion to develop the cyan color. Likewise, in a case of causing the second layer 31B to develop a color, irradiation is performed with the infrared light of the wavelength $\lambda_2$ at energy enough to cause the second layer 31B to reach a color-developing temperature. In a case of causing the third layer 31C to develop a color, irradiation is performed with the infrared light of the wavelength $\lambda_3$ at energy enough to cause the third layer 31C to reach a color-developing temperature. This causes the respective photothermal conversion agents B and C included in the second layer 31B and the third layer 31C to generate heat to cause respective coloring reactions to occur between the respective coloring compounds and the respective color developing/quenching agents, thus allowing the respective irradiated portions to develop the magenta color and the yellow color. In this manner, irradiating respective desired portions with pieces of infrared light of the corresponding wavelengths makes it possible to record information (e.g., a full-color image).

Meanwhile, in a case of decoloring the first layer 31A, the second layer 31B, and the third layer 31C that have been subjected to the color development in the above-described manner, irradiation is performed with pieces of infrared light of the respective wavelengths corresponding to the layers 31A, 31B, and 31C at energy enough to cause the layers to reach respective decoloring temperatures. This causes the photothermal conversion agents A, B, and C included in the first layer 31A, the second layer 31B, and the third layer 31C to generate heat to cause respective decoloring reactions to occur between the coloring compound A and the color developing/quenching agent A, between the coloring compound B and the color developing/quenching agent B, and between the coloring compound C and the color developing/quenching agent C, thus allowing respective irradiated portions to be decolored and respective records to be deleted. Further, in a case of deleting all of the records formed on the recording layer 31 at a time, the recording layer 31 is heated at a temperature enough to decolor all of the first layer 31A, the second layer 31B, and the third layer 31C, e.g., at 120° C. This allows information recorded on the recording layer 31 (the first layer 31A, the second layer 31B, and the third layer 31C) to be deleted at a time. Thereafter, repeated recording onto the recording layer 31 is possible by performing the above-described operations.

As described above, in the present modification example, for example, three layers (the first layer 31A, the second layer 31B, and the third layer 31C) are formed and stacked that include the respective coloring compounds (the coloring compound A, the coloring compound B, and the coloring compound C) to be colored in the yellow color, the magenta color, and the cyan color, the respective corresponding color developing/quenching agents (the color developing/quenching agent A, the color developing/quenching agent B, and the color developing/quenching agent C), and the respective photothermal conversion agents (the photothermal conversion agent A, the photothermal conversion agent B, and the photothermal conversion agent C) having absorption wavelengths different from each other. This makes it possible to provide the recording medium 5 allowing for multicolor recording.

2-5. Modification Example 5

Modification Example 4 above illustrates the recording medium 5 having a multilayer structure in which, as the recording layer 31, multiple layers (the first layer 31A, the second layer 31B, and the third layer 31C) to be colored in mutually different colors are formed and stacked. However, it is possible to achieve a recording medium (a recording medium 6) that allows for multicolor display even with a single-layer structure, for example.

FIG. 8 illustrates a recording layer 41 including a mixture of three types of microcapsules 41*a*, 41*b*, and 41*c* that include respective coloring compounds (the coloring compound A, the coloring compound B, and the coloring compound C) to be colored in mutually different colors (e.g., a cyan color (C), a magenta color (M), and a yellow color (Y)), respective color developing/quenching agents (the color developing/quenching agent A, the color developing/quenching agent B, and the color developing/quenching agent C) corresponding to the respective coloring compounds, and respective photothermal conversion agents (the photothermal conversion agent A, the photothermal conversion agent B, and the photothermal conversion agent C) that absorb pieces of light in mutually different wavelength regions to thereby generate heat. It is possible to form the recording layer 41 by, for example, dispersing the above-described microcapsules 41*a*, 41*b*, and 41*c* in the macromolecular material that is listed as a constituent material of the recording layer 11 described above and applying the resultant dispersion onto the support base 21. It is to be noted that the materials included in the intermediate layers 32 and 33 described above, for example, are preferably used for the microcapsules 41*a*, 41*b*, and 41*c* containing the above-described materials.

As described above, in the present modification example, the respective coloring compounds (the coloring compound A, the coloring compound B, and the coloring compound C) to be colored in the yellow color, the magenta color, and the cyan color, the respective corresponding color developing/quenching agents (the color developing/quenching agent A, the color developing/quenching agent B, and the color developing/quenching agent C), and the respective photothermal conversion agents (the photothermal conversion agent A, the photothermal conversion agent B, and the photothermal conversion agent C) having mutually different absorption wavelengths are encapsulated in the microcapsules 41*a*, 41*b*, and 41*c*, and they are dispersed in the macromolecular material to form the recording layer 41. This makes it possible to provide the recording medium 3 having a single-layer structure and allowing for multicolor display.

It is to be noted that although the foregoing embodiment, Modification Example 4, etc. illustrate an example in which the recording layer 11 and the recording layer 31 (the first layer 31A, the second layer 31B, and the third layer 31C) each include a single (one type of) coloring compound, this is not limitative. The recording layers 11 and 31 (the first layer 31A, the second layer 31B, and the third layer 31C) may each include a mixture of multiple types of coloring compounds to be colored in different colors.

It is difficult to perform, in a recording medium, color reproduction of CMY (cyan, magenta, and yellow) according to Japan Color certification system with use of a single coloring compound (a leuco dye). In addition, the photothermal conversion agent has a slight color tone, and thus a color tone of each of the recording layers 11 and 31 slightly varies depending on the type and content of the photothermal conversion agent. Developing a coloring compound to respond to the slight variation on an as-needed basis causes a significant reduction in production efficiency.

To cope with this, forming the recording layer 11 and the recording layer 31 (the first layer 31A, the second layer 31B, and the third layer 31C) by mixing multiple types of coloring compounds (the coloring compound A, the coloring compound B, and the coloring compound C) makes it possible to reproduce various colors including CMY according to the Japan Color certification system. For example, the cyan color is reproducible by mixing a coloring compound to be colored in a blue color and a coloring compound to be colored in a green color at a predetermined ratio. The magenta color is reproducible by mixing a coloring compound to be colored in a red color and a coloring compound to be colored in an orange color at a predetermined ratio.

3. APPLICATION EXAMPLES

Next, a description will be given of application examples of the recording media (the recording media 1 to 6) described in the foregoing embodiment and Modification Examples 1 to 5. The recording media 1 to 6 described above are applicable to a portion of various electronic apparatuses or various clothing accessories. Examples of the various electronic apparatuses include so-called wearable terminals, including watches (wristwatches) and headphones. Other examples of the various electronic apparatuses include wearable displays including head-up displays and head-mounted displays, portable devices including portable music players and portable game machines, robots, refrigerators, washing machines, and the like. The kinds of the electronic apparatuses are not particularly limited. Examples of the clothing accessories include bags, clothes, hats and caps, helmets, glasses, shoes, and the like. Further, the applications are not limited to the electronic apparatuses and the clothing accessories, and it is also possible to apply the recording media to, as decorative members, the interior and exterior of automobiles, the interior and exterior of buildings, such as walls, the exterior of furniture including desks, the interior and exterior of buildings, such as walls, the exterior of furniture including desks, and the like. It is to be noted that configurations of the electronic apparatuses and the like described below are mere examples, and the configurations are appropriately modifiable.

Application Example 1

FIGS. 9A and 9B each illustrate an external appearance of an IC card with a rewritable function. The IC card has a card surface that serves as a printing surface 110, and includes, for example, a sheet-shaped recording medium 1 or the like attached thereto. By disposing the recording medium 1 or the like on the printing surface 110, the IC card allows for drawing on the printing surface 110, and also rewriting and deletion thereof as appropriate, as illustrated in FIGS. 9A and 9B. It is to be noted that while the IC card is described here as an example, this is not limitative, and application to an identification card or the like, for example, is also possible.

Application Example 2

FIG. 10A illustrates an external appearance configuration of a front surface of a smartphone, and FIG. 10B illustrates an external appearance configuration of a rear surface of the smartphone illustrated in FIG. 10A. The smartphone includes, for example, a display part 210, a non-display part 220, and a casing 230. An entire surface, for example, of the casing 230 on the rear surface side is provided with, for example, the recording medium 1 as the exterior member of the casing 230. This allows for display of various color patterns on the casing 230, as illustrated in FIG. 10B. It is to be noted that while the smartphone is described here as an example, this is not limitative, and application to a notebook personal computer (PC), a tablet PC, or the like, for example, is also possible.

Application Example 3

FIGS. 11A and 11B each illustrate an external appearance of a bag. The bag includes, for example, a storing part 310 and a handle 320, and the recording medium 1, for example, is attached to the storing part 310, for example. Various letters and patterns are displayed on the storing part 310 by means of the recording medium 1. In addition, attaching the recording medium 1 or the like to a portion of the handle 320 allows for display of various color patterns, and allows for a change in design of the storing part 310, like a change from an example in FIG. 11A to an example in FIG. 11B. This makes it possible to provide an electronic device that is useful also for fashion purposes.

Application Example 4

FIG. 12 illustrates a configuration example of a wristband that allows for recording of, for example, attraction-riding history, schedule information, and the like in an amusement park, for example. The wristband includes belt parts 411 and 412 and an information recording part 420. The belt parts 411 and 412 have a band shape, for example, and respective ends (not illustrated) thereof are configured to be couplable to each other. The recording medium 1, for example, is attached to the information recording part 420, with an information code CD, for example, as well as the attraction-riding history MH2 and schedule information IS (IS1 to IS3) described above, being recorded thereon. In the amusement park, a visitor is able to record the above-described information by waving the wristband over a drawing apparatus installed at each of various locations such as attraction-riding reservation spots.

A riding history mark MH1 indicates the number of attractions ridden by a visitor who wears the wristband in the amusement park. In this example, a larger number of star-shaped marks are recorded as the riding history mark MH1 with increasing number of attractions ridden by the visitor. It is to be noted that this is not limitative and, for example, the mark may change color in accordance with the number of attractions ridden by the visitor.

The schedule information IS in this example indicates a schedule of the visitor. In this example, information about all of events including an event reserved by the visitor and an event to be held in the amusement park is recorded as the schedule information IS1 to IS3. Specifically, in this example, a title of an attraction (an attraction 201) of which riding is reserved by the visitor and a scheduled time of the riding are recorded as the schedule information IS1. Further, an event in the park such as a parade and its scheduled starting time are recorded as the schedule information IS2. Further, a restaurant reserved beforehand by the visitor and its scheduled mealtime are recorded as the schedule information IS3.

The information code CD records, for example, identification information IID that is used to identify the wristband and website information IWS.

Application Example 5

FIG. 13A illustrates an external appearance of a top surface of an automobile, and FIG. 13B illustrates an external appearance of a side surface of the automobile. As described above, by providing the recording medium 1 or the like of the present disclosure on, for example, a vehicle body such as a bonnet 611, a bumper 612, a roof 613, a trunk cover 614, a front door 615, a rear door 616, or a rear bumper 617, it is possible to display various information and color patterns on each of the parts. In addition, by providing the recording medium 1 or the like on the interior of the automobile, e.g., on a steering wheel, a dashboard, or the like, it is possible to display various color patterns thereon.

Application Example 6

FIG. 14 illustrates an external appearance of a cosmetic case. The cosmetic case includes, for example, a containing part 710 and a lid 720 covering the containing part 710. For example, to the lid 720, the recording medium 1, for example, is attached at a front surface, a back surface, or both. The lid 720 is decorated with, for example, a drawing pattern and a color pattern as illustrated in FIG. 14, or letters and the like by means of the recording medium 1. It is possible to rewrite and delete the drawing pattern, the color pattern, the letters, or the like on the lid 720 by a drawing and deleting unit installed in a store, for example.

4. EXAMPLES

Next, Examples of the present disclosure will be described in detail.

Experimental Example 1

First, a recording layer (corresponding to the recording layer 11) was formed by the foregoing manufacturing method, and respective barrier films (corresponding to the first barrier films 14 and 15) each having a water vapor transmission rate of 0.01 $g/m^2$/day and including a stacked film of a plastic film and an inorganic oxide film were attached to a front surface and a back surface of the recording layer with respective adhesive layers (corresponding to the adhesive layers 12 and 13) interposed therebetween. Subsequently, an organic-inorganic hybrid resin (SILPULUS available from NIPPON STEEL Chemical & Material Co., Ltd.) was applied onto a glass substrate into a film thickness of 8 μm with use of a bar coater (SELECTROLLER available from OSP Co., Ltd.), and side surfaces of the recording layer including the barrier films and the adhesive layers were pressed against the organic-inorganic hybrid resin on the glass substrate to thereby transfer the organic-inorganic hybrid resin to the side surfaces. A barrier film (corresponding to the second barrier film 16) was thereby formed. Thereafter, the organic-inorganic hybrid resin was cured by irradiating each of the side surfaces with UV light of a total of 1500 $mj/cm^2$ for approximately 150 seconds with use of an ultraviolet curing unit (HB400E-1 available from SEN LIGHTS Corporation, wavelength: 365 nm, illuminance: 10 $mW/cm^2$) equipped with a high-pressure mercury lamp, while performing a purge with a nitrogen ($N_2$) gas. A recording medium was thereby fabricated.

Experimental Example 2

In Experimental Example 2, a recording medium was fabricated by a method similar to that in Experimental Example 1 described above except that the organic-inorganic hybrid resin was applied onto a glass substrate into a thickness of 16 μm.

Experimental Example 3

In Experimental Example 3, a recording medium was fabricated by a method similar to that in Experimental Example 1 described above except that the organic-inorganic hybrid resin was applied onto a glass substrate into a thickness of 22 μm.

Experimental Example 4

In Experimental Example 4, a recording medium was fabricated by a method similar to that in Experimental Example 1 described above except that the organic-inorganic hybrid resin was applied onto a glass substrate into a thickness of 33 μm.

Experimental Example 5

In Experimental Example 5, a recording medium was fabricated by a method similar to that in Experimental Example 1 described above except that the organic-inorganic hybrid resin was applied onto a glass substrate into a thickness of 53 μm.

Experimental Example 6

In Experimental Example 6, a recording medium was fabricated by a method similar to that in Experimental Example 1 described above except that a modified acrylate A was applied, instead of the organic-inorganic hybrid resin, onto a glass substrate into a thickness of 30 μm.

Experimental Example 7

In Experimental Example 7, a recording medium was fabricated by a method similar to that in Experimental Example 6 described above except that the modified acrylate A was applied onto a glass substrate into a thickness of 60 μm.

Experimental Example 8

In Experimental Example 8, a recording medium was fabricated by a method similar to that in Experimental Example 6 described above except that the modified acrylate A was applied onto a glass substrate into a thickness of 90 μm.

Experimental Example 9

In Experimental Example 9, a recording medium was fabricated by a method similar to that in Experimental Example 6 described above except that the modified acrylate A was applied onto a glass substrate into a thickness of 120 μm.

Experimental Example 10

In Experimental Example 10, a recording medium was fabricated by a method similar to that in Experimental Example 1 described above except that a modified acrylate B was applied, instead of the organic-inorganic hybrid resin, onto a glass substrate into a thickness of 30 μm.

Experimental Example 11

In Experimental Example 11, a recording medium was fabricated by a method similar to that in Experimental Example 10 described above except that the modified acrylate B was applied onto a glass substrate into a thickness of 60 μm.

Experimental Example 12

In Experimental Example 12, a recording medium was fabricated by a method similar to that in Experimental Example 10 described above except that the modified acrylate B was applied onto a glass substrate into a thickness of 90 μm.

Experimental Example 13

In Experimental Example 13, a recording medium was fabricated by a method similar to that in Experimental Example 10 described above except that the modified acrylate B was applied onto a glass substrate into a thickness of 120 μm.

Experimental Examples 1 to 13 were evaluated for chemical resistance. Further, Experimental Examples 1 to 5 were evaluated for external appearance.

(Evaluations of Chemical Resistance and External Appearance)

First, the recording media fabricated in Experimental Examples 1 to 13 described above were observed. Subsequently, a sunscreen (Mentholatum Sunplay Super Block d available from Rohto Pharmaceutical Co., Ltd.) as a chemical was applied to the surfaces of the recording media, following which the recording media were stored in a constant temperature bath at a temperature of 60° C. and a humidity of 80% for 24 hours. Thereafter, the temperature was returned to room temperature, and observations were performed with the sunscreen wiped off. Chemical resistance was evaluated on the basis of the presence or absence of discoloration by a visual check before and after the storing at the constant temperature. For external appearance, the visibility of information written on the recording layer was visually evaluated. Table 3 summarizes results of the evaluations of Experimental Examples 1 to 13 for chemical resistance and the evaluations of Experimental Examples 1 to 5 for external appearance. A case where no discoloration was recognized and a case where the information written on the recording layer was clearly visible were evaluated as A. A case where discoloration was recognized and a case where the information written on the recording layer was not clearly visible were evaluated as B.

TABLE 1

| | Applied film thickness | Chemical resistance | External appearance |
|---|---|---|---|
| Experimental Example 1 | 8 μm | B (discoloration) | A |
| Experimental Example 2 | 16 μm | A | A |
| Experimental Example 3 | 22 μm | A | A |
| Experimental Example 4 | 33 μm | A | A |
| Experimental Example 5 | 53 μm | A | B |
| Experimental Example 6 | 30 μm | B (discoloration) | — |
| Experimental Example 7 | 60 μm | B (discoloration) | — |
| Experimental Example 8 | 90 μm | B (discoloration) | — |
| Experimental Example 9 | 120 μm | B (discoloration) | — |
| Experimental Example 10 | 30 μm | B (discoloration) | — |
| Experimental Example 11 | 60 μm | B (discoloration) | — |
| Experimental Example 12 | 90 μm | B (discoloration) | — |
| Experimental Example 13 | 120 μm | B (discoloration) | — |

Table 1 indicates that among Experimental Examples 1 to 5 in which the organic-inorganic hybrid resin was used to form the barrier film on the side surfaces (the second barrier film), good evaluation results on chemical resistance and external appearance were obtained for Experimental Examples 2 to 3 in which the applied film thickness was 16 μm to 33 μm. In Experimental Example 1 in which the applied film thickness was 8 μm, discoloration was recognized on the recording layer after the storing at the constant temperature. Experimental Example 5 in which the applied film thickness was 53 μm was low in visibility. Meanwhile, in all of Experimental Examples 6 to 13 in which the modified acrylate A or B was used to form the barrier film on the side surfaces (the second barrier film), discoloration of the recording layer was recognized after the storing at the constant temperature irrespective of the film thickness. From the foregoing, it was found to be preferable that the barrier film on the side surfaces (the second barrier film) include the organic-inorganic hybrid resin, and a preferable film thickness was found to be 16 μm to 33 μm.

Although the present disclosure has been described above with reference to the embodiment, Modification Examples 1 to 5, Application Examples, and Examples, the present disclosure is not limited to aspects described in the foregoing embodiment and the like, and may be modified in a variety of ways. For example, in the foregoing embodiment and the like, a recording layer having reversibility (e.g., the recording layer 11) has been described as an example; however, writing onto a recording layer may be irreversible.

In addition, not all the components described in the foregoing embodiment and the like have to be provided, and any other component may further be included. For example, a reflective layer may be provided on the back surface (the surface S2) of the recording layer 11. The provision of the reflective layer allows for more vivid color display. The reflective layer may be provided in contact with the surface S2 of the recording layer 11, or may be provided on the surface S2 of the recording layer 11 with the adhesive layer 12, the first barrier film 14 or 15, or the like interposed therebetween. Moreover, the materials and thicknesses of the components described above are merely examples, and the described materials and thicknesses are not limitative.

Moreover, although Modification Example 5 described above illustrates an example in which microcapsules are used to perform multicolor display with a single-layer structure, this is not limitative, and it is also possible to perform multicolor display with use of, for example, a fiber-shaped three-dimensional stereoscopic structure. The fiber to be used here preferably has, for example, a so-called core-sheath structure including a core part that includes a coloring compound to be colored in a desired color, a color developing/quenching agent corresponding thereto, and a photothermal conversion material, and a sheath part that covers the core part and includes a heat-insulating material. By forming the three-dimensional stereoscopic structure with use of multiple types of fibers having the core-sheath structure and including respective coloring compounds to be colored in different colors, it is possible to fabricate a recording medium allowing for multicolor display.

In addition, although the foregoing embodiment and the like illustrate an example in which a laser is used to perform color development and decoloring of the recording layers, this is not limitative. For example, a thermal head may be used to perform color development and decoloring.

It is to be noted that the effects described in the present specification are merely exemplary and not limitative, and other effects may be achieved.

It is to be noted that the present disclosure may have the following configurations. According to the present technology having the following configurations, the second barrier film having chemical resistance is provided on the side surfaces of the recording layer continuously from the side surfaces of the recording layer and the peripheral part of the one surface to the peripheral part of the other surface of the recording layer. This reduces the non-display region in the outer edge part of the recording layer while suppressing entry of environmental contaminants into the recording layer. Accordingly, it is possible to provide a recording medium having superior durability of display quality and designability.

(1)

A recording medium including:

a recording layer including a leuco dye as a coloring compound;

a first barrier film that is provided on each of one surface and another surface opposed to the one surface of the recording layer, and suppresses intrusion of moisture, oxygen, or both; and a second barrier film having chemical resistance and provided on a side surface of the recording layer continuously at least from a peripheral part of the one surface to a peripheral part of the other surface of the recording layer.

(2)

The recording medium according to (1), in which the second barrier film covering the side surface of the recording layer has a film thickness of 16 μm or more and 33 μm or less.

(3)

The recording medium according to (1) or (2), in which a surface of the second barrier film covering the side surface of the recording layer includes a curved surface.

(4)

The recording medium according to (3), in which the second barrier film covering the side surface of the recording layer has a maximum film thickness of 33 μm or less.

(5)

The recording medium according to (3) or (4), in which the second barrier film on the side surface of the recording layer has curvatures different between a side of the one surface and a side of the other surface.

(6)

The recording medium according to any one of (1) to (5), in which the second barrier film extending on the one surface has a film thickness of 10 μm or less.

(7)

The recording medium according to any one of (1) to (6), in which a width of the second barrier film extending on each of the one surface and the other surface is 33 μm or less from an end of the recording layer.

(8)

The recording medium according to any one of (1) to (7), in which the second barrier film has a surface hardness of 6H or more.

(9)

The recording medium according to any one of (1) to (8), in which the second barrier film includes an ultraviolet curable resin.

(10)

The recording medium according to (9), in which the ultraviolet curable resin includes an organic-inorganic hybrid material.

(11)

The recording medium according to (10), in which the organic-inorganic hybrid material has a silsesquioxane skeleton represented by a composition formula $[(RSiO_{1.5})_n]$.

(12)

The recording medium according to (11), in which the silsesquioxane skeleton is represented by any one of the following formulae (1) to (5).

[Chem. 1]

(1)

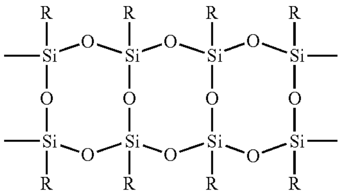

(2)

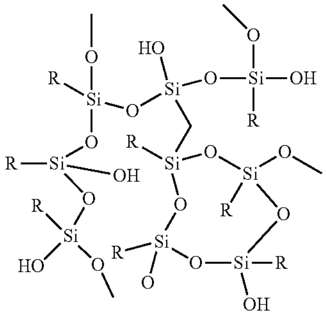

[Chem. 2]

(3)

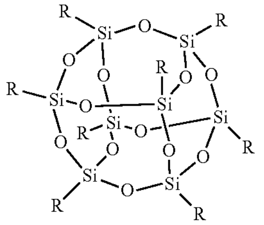

(4)

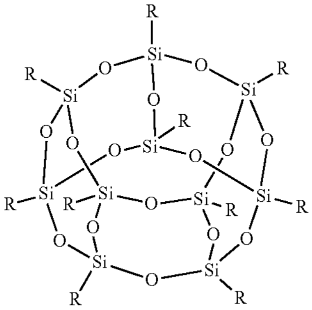

(5)

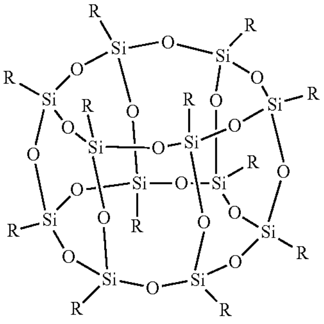

(13)

The recording medium according to any one of (1) to (12), in which the side surface of the recording layer is inclined.

(14)

The recording medium according to any one of (1) to (13), in which the first barrier film has a water vapor transmission rate of 0.001 $g/m^2$/day or more and 10 $g/m^2$/day or less.

(15)

The recording medium according to any one of (1) to (14), further including an ultraviolet absorbing layer, a hard coat layer, or both on the first barrier film provided on the one surface of the recording layer.

(16)

The recording medium according to any one of (1) to (15), in which the recording layer includes multiple layers to be colored in mutually different colors.

(17)

The recording medium according to any one of (1) to (16), in which the recording layer includes one or both of a reversible recording layer and an irreversible recording layer.

(18)

An exterior member including a support base provided with at least a recording medium, the recording medium including:

a recording layer including a leuco dye as a coloring compound;

a first barrier film that is provided on each of one surface and another surface opposed to the one surface of the recording layer, and suppresses intrusion of moisture, oxygen, or both; and a second barrier film having chemical resistance and provided on a side surface of the recording layer continuously at least from a peripheral part of the one surface to a peripheral part of the other surface of the recording layer.

This application claims the benefit of Japanese Priority Patent Application JP2019-239314 filed with the Japan Patent Office on Dec. 27, 2019, the entire contents of which are incorporated herein by reference.

It should be understood by those skilled in the art that various modifications, combinations, sub-combinations, and alterations may occur depending on design requirements and other factors insofar as they are within the scope of the appended claims or the equivalents thereof.

The invention claimed is:

1. A recording medium comprising:

a recording layer including a leuco dye as a coloring compound;

a first barrier film that is provided on each of one surface and another surface opposed to the one surface of the recording layer, and suppresses intrusion of moisture, oxygen, or both with the recording layer; and a second barrier film having chemical resistance and provided on a side surface of the recording layer continuously at least from a peripheral part of the one surface to a peripheral part of the another surface of the recording layer, wherein the side surface of the recording layer is inclined.

2. The recording medium according to claim 1, wherein the second barrier film provided on the side surface of the recording layer has a film thickness of 16 μm or more and 33 μm or less.

3. The recording medium according to claim 1, wherein a surface of the second barrier film provided on the side surface of the recording layer includes a curved surface.

4. The recording medium according to claim 3, wherein the second barrier film provided on the side surface of the recording layer has a maximum film thickness of 33 μm or less.

5. The recording medium according to claim 3, wherein the second barrier film on the side surface of the recording layer has a different curvature between a side of the one surface and a side of the another surface.

6. The recording medium according to claim 1, wherein the second barrier film extends onto the one surface and a film thickness of the second barrier film extending onto the one surface is 10 μm or less.

7. The recording medium according to claim 1, wherein the second barrier film extends onto each of the one surface and the other surface and a width of second barrier film extending on each of the one surface and the other surface is 33 μm or less from an end of the recording layer.

8. The recording medium according to claim 1, wherein the second barrier film has a surface hardness of 6H or more.

9. The recording medium according to claim 1, wherein the second barrier film is formed from an ultraviolet curable resin.

10. The recording medium according to claim 9, wherein the ultraviolet curable resin comprises an organic-inorganic hybrid material.

11. The recording medium according to claim 10, wherein the organic-inorganic hybrid material has a silsesquioxane skeleton represented by a composition formula $[(RSiO_{1.5})_n]$, wherein R is an organic group.

12. The recording medium according to claim 11, wherein the silsesquioxane skeleton is represented by any one of the following formulae (1) to (5):

(1)

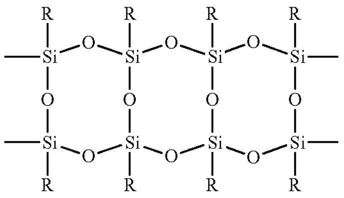

(2)

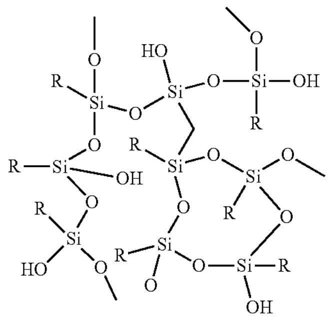

(3)

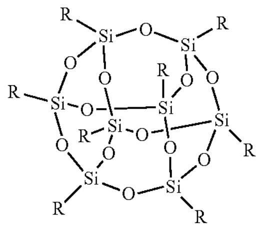

-continued (4)

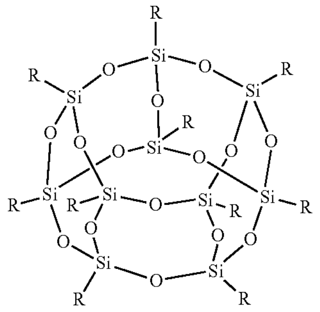

(5)

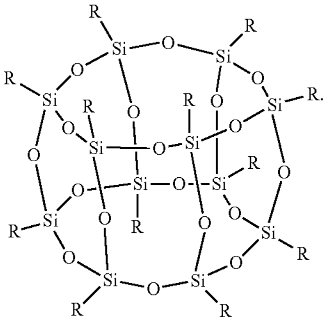

13. The recording medium according to claim 1, wherein the first barrier film has a water vapor transmission rate of 0.001 $g/m^2$/day or more and 10 $g/m^2$/day or less.

14. The recording medium according to claim 1, further comprising an ultraviolet absorbing layer, a hard coat layer, or both on the first barrier film provided on the one surface of the recording layer.

15. The recording medium according to claim 1, wherein the recording layer includes multiple layers to be colored in mutually different colors.

16. The recording medium according to claim 1, wherein the recording layer includes one or both of a reversible recording layer and an irreversible recording layer.

17. An exterior member comprising a support base and at least a recording medium on the support base, the recording medium including:

a recording layer including a leuco dye as a coloring compound;

a first barrier film that is provided on each of one surface and another surface opposed to the one surface of the recording layer, and suppresses intrusion of moisture, oxygen, or both with the recording layer; and second barrier film having chemical resistance and provided on a side surface of the recording layer continuously at least from a peripheral part of the one surface to a peripheral part of the another surface of the recording layer, wherein the side surface of the recording layer is inclined.

18. A recording medium comprising:

a recording layer including a leuco dye as a coloring compound;

a first barrier film that is provided on each of one surface and another surface opposed to the one surface of the recording layer, and suppresses intrusion of moisture, oxygen, or both with the recording layer; and a second barrier film having chemical resistance and provided on a side surface of the recording layer continuously at least from a peripheral part of the one surface to a peripheral part of the another surface of the recording layer, wherein a surface of the second barrier film provided on the side surface of the recording layer includes a curved surface.

19. The recording medium according to claim 18, wherein the second barrier film provided on the side surface of the recording layer has a maximum film thickness of 33 μm or less.

20. The recording medium according to claim 18, wherein the second barrier film on the side surface of the recording layer has a different curvature between a side of the one surface and a side of the another surface.

21. An exterior member comprising a support base and at least a recording medium on the support base, the recording medium according to claim 18.

22. A recording medium comprising:

a recording layer including a leuco dye as a coloring compound;

a first barrier film that is provided on each of one surface and another surface opposed to the one surface of the recording layer, and suppresses intrusion of moisture, oxygen, or both with the recording layer; and a second barrier film having chemical resistance and provided on a side surface of the recording layer continuously at least from a peripheral part of the one surface to a peripheral part of the another surface of the recording layer, wherein the second barrier film is formed from an ultraviolet curable resin, wherein the ultraviolet curable resin comprises an organic-inorganic hybrid material, wherein the organic-inorganic hybrid material has a silsesquioxane skeleton represented by a composition formula $[(RSiO_{1.5})_n]$, and wherein R is an organic group.

23. The recording medium according to claim 22, wherein the silsesquioxane skeleton is represented by any one of the following formulae (1) to (5):

(1)

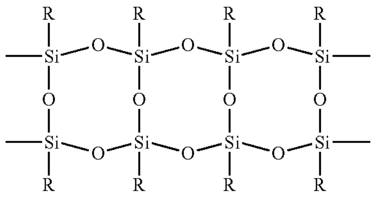

-continued
(2)
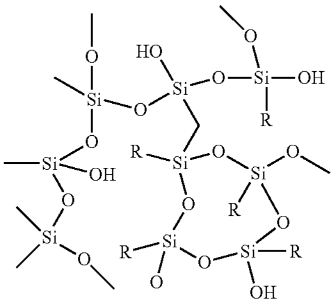
(3)
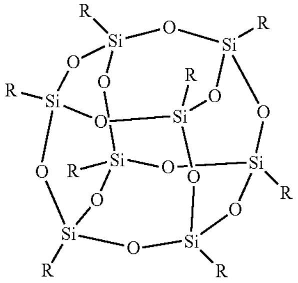
-continued
(4)
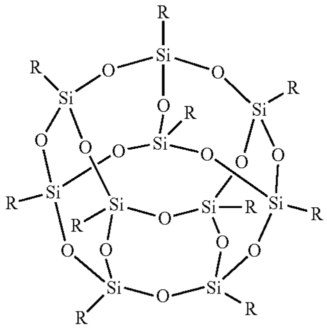
(5)
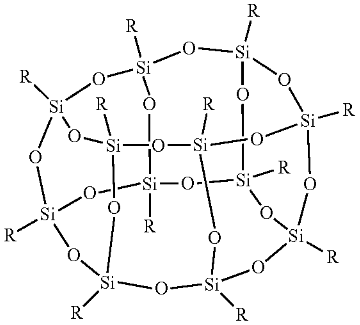
24. An exterior member comprising a support base and at least a recording medium on the support base, the recording medium according to claim 22.
* * * * *